(12) United States Patent
Fu

(10) Patent No.: US 12,544,074 B2
(45) Date of Patent: Feb. 10, 2026

(54) DELIVERY DEVICE AND DELIVERY SYSTEM

(71) Applicant: Lifetech Scientific (Shenzhen) Co. Ltd., Guangdong (CN)

(72) Inventor: Mingjuan Fu, Shenzhen (CN)

(73) Assignee: Lifetech Scientific (Shenzhen) Co. Ltd., Guangdong (CN)

( * ) Notice: Subject to any disclaimer, the term of this patent is extended or adjusted under 35 U.S.C. 154(b) by 300 days.

(21) Appl. No.: 18/267,426

(22) PCT Filed: Oct. 21, 2021

(86) PCT No.: PCT/CN2021/125255
§ 371 (c)(1),
(2) Date: Jun. 14, 2023

(87) PCT Pub. No.: WO2022/127359
PCT Pub. Date: Jun. 23, 2022

(65) Prior Publication Data
US 2024/0108349 A1    Apr. 4, 2024

(30) Foreign Application Priority Data
Dec. 17, 2020 (CN) .......................... 202011496282.0

(51) Int. Cl.
*A61B 17/12* (2006.01)
*A61B 17/00* (2006.01)

(52) U.S. Cl.
CPC ............. *A61B 17/12022* (2013.01); *A61B 2017/00367* (2013.01); *A61B 2017/00982* (2013.01); *A61B 2017/1205* (2013.01)

(58) Field of Classification Search
CPC .... A61B 17/12022; A61B 2017/00367; A61B 2017/00982; A61B 2017/1205;
(Continued)

(56) References Cited

U.S. PATENT DOCUMENTS

2003/0171642 A1*  9/2003  Schock ................ A61M 25/09
                                                                    600/18
2012/0316602 A1   12/2012 Gore
(Continued)

FOREIGN PATENT DOCUMENTS

CN          102802538 A       11/2012
CN          103654883 A        3/2014
(Continued)

OTHER PUBLICATIONS

International Search Report dated Jan. 25, 2022 for corresponding PCT Application No. PCT/CN2021/125266.
(Continued)

*Primary Examiner* — Richard G Louis
(74) *Attorney, Agent, or Firm* — Raymond Sun

(57) ABSTRACT

A delivery device (40) and a delivery system (100) are provided. The delivery device (40) includes an operating handle (410), a regulating member (420) and a first driving assembly (450), where the operating handle (410) includes an accommodating cavity; in a natural state, the regulating member (420) includes a bent section (422), and an end of the regulating member (420) that is away from the bent section (422) extends into the accommodating cavity; the first driving assembly (450) is arranged on the operating handle (410), is connected to the regulating member (420), and is configured to control an axial displacement of the regulating member (420), so that the bent section (422) of the regulating member (420) abuts against an implantable instrument to realize forming of the implantable instrument. The delivery device (40) can form the implantable instrument.

13 Claims, 19 Drawing Sheets

(58) Field of Classification Search
CPC .......... A61B 2017/00575; A61B 2017/00592;
A61B 2017/00601; A61B 2017/00606;
A61B 2017/00623; A61B 17/0057; A61B
17/12031; A61B 17/12122; A61B
2017/00004; A61B 2017/00867; A61B
17/12109; A61B 17/12159; A61B
17/12172; A61B 2017/00871; A61F
2250/0039; A61F 2/011; A61F 2/0108;
A61F 2/9517; A61F 2/01
See application file for complete search history.

(56) References Cited

U.S. PATENT DOCUMENTS

| | | | |
|---|---|---|---|
| 2014/0088640 A1* | 3/2014 | Devellian | A61B 17/0057 606/213 |
| 2020/0121306 A1 | 4/2020 | Chen | |
| 2020/0222034 A1 | 7/2020 | Liu | |

FOREIGN PATENT DOCUMENTS

| | | | | |
|---|---|---|---|---|
| CN | 109247959 A | * | 1/2019 | ......... A61B 17/0057 |
| CN | 111803166 A | | 10/2020 | |
| CN | 112998770 A | | 6/2021 | |
| CN | 112998771 A | | 6/2021 | |
| CN | 112998796 A | | 6/2021 | |
| WO | WO2015002625 | | 1/2015 | |
| WO | WO 2015002625 A1 | | 1/2015 | |

OTHER PUBLICATIONS

Office Action dated Apr. 29, 2023 for China Application No. 202011496282.0.

Search Report dated Oct. 24, 2024 for corresponding European Application No. 21 90 5288.

* cited by examiner

DELIVERY DEVICE AND DELIVERY SYSTEM

TECHNICAL FIELD

The embodiments relate to the field of interventional medical instruments, particularly to a delivery device and a delivery system.

BACKGROUND

This section provides only background information related to the present invention, which is not necessarily the prior art.

Percutaneous interventional therapy has been a rapidly developed disease therapy in recent years, which is also increasingly applicable to a wide range of treatment areas. Through the use of a transcatheter interventional therapy, instruments and/or drugs can be delivered to the heart, arteriovenous vessels and other parts of a patient. The instruments may be a heart occluder, a vascular occluder, a vascular filter, etc.

Traditional instruments such as the heart occluder or the vascular occluder are generally made of a shape memory alloy material which has excellent elasticity, and can return to the original shape and better fit the tissue of the defective site after being released. However, the current memory alloy material is generally a material that cannot be corroded or degraded in an organism. When endothelialization is completed to achieve complete occlusion, the occluder made of the memory alloy material will be permanently left in the body, which may lead to a long-term clinical risk.

For the occluder or other implantable instruments made of an absorbable polymer material, the polymer material can be degraded in the body, so that the occluder can be gradually degraded, and degradation products are absorbed by the body and will not be left in the organism. However, the polymer material generally lacks elasticity and shape memory characteristic, so that the shape recovery ability of the occluder is poor. After the occluder is released from a delivery sheath, it is difficult for the occluder to be restored an expanded state and form a plug.

SUMMARY

Based on the above, the embodiments provide a delivery device that can shape the implantable instrument.

A delivery device is configured to deliver an implantable instrument, and includes:
an operating handle, including an accommodating cavity;
a regulating member, wherein in a natural state, the regulating member includes a bent section, and an end of the regulating member that is away from the bent section extends into the accommodating cavity; and
a first driving assembly, arranged on the operating handle, connected to the regulating member, and configured to control an axial displacement of the regulating member, so that the bent section of the regulating member abuts against an implantable instrument to achieve shaping of the implantable instrument.

In one embodiment, the first driving assembly includes a guide rail, a first rotating member and a second rotating member; the guide rail and the first rotating member are accommodated in the accommodating cavity; the guide rail is connected with the first rotating member and the second rotating member; the regulating member is connected with the first rotating member; the second rotating member is connected with the operating handle and is able to rotate relative to the operating handle; the rotation of the second rotating member drives the guide rail to rotate; the rotation of the guide rail drives the first rotating member to rotate; and the rotation of the first rotating member drives the regulating member to axially move.

In one embodiment, the first rotating member includes a fixed portion, a rotary portion and two abutment portions; the fixed portion is fixed in the accommodating cavity; the rotary portion is connected with the guide rail, and the rotary portion is rotatable relative to the fixed portion; the regulating member is threaded through the rotary portion; the regulating member is not fixedly connected with the rotary portion; the two abutment portions are fixedly connected with the regulating member; and the two abutment portions are located at two ends of the rotary portion.

In one embodiment, an internal thread is formed on an inner wall of the fixed portion; an external thread is formed on an outer wall of the rotary portion; and the internal thread and the external thread cooperate with each other to enable the rotary portion to be rotatable and axially movable relative to the fixed portion.

In one embodiment, the first rotating member further includes a reinforcement tube; the reinforcement tube surrounds the regulating member; the reinforcement tube is threaded through the rotary portion; and the two abutment portions are fixedly connected with the reinforcement tube.

In one embodiment, the delivery device further includes a push member and a second driving assembly; the second driving assembly includes a sliding button; the push member is connected with the sliding button; and the sliding button is movable axially along the guide rail to drive the push member to move axially.

In one embodiment, the fixed portion is fixedly connected with the sliding button or the fixed portion is not fixedly connected with the sliding button.

In one embodiment, the second rotating member includes a base, a regulating rod and a screw cap; the regulating rod is inserted into the base; the screw cap surrounds the regulating rod and the base; the base is rotatably connected with the operating handle; and the guide rail is connected with the regulating rod.

In one embodiment, the regulating member includes a straight extending section, and the straight extending section is connected with the bent section, the bent section includes a first bent portion and a second bent portion connected with the first bent portion; an end of the first bent portion that is far away from the second bent portion is connected with the straight extending section; in the natural state, the first bent portion is not parallel to the straight extending section; or, the bent section is a straight rod type; and the bent section is bent relative to the straight extending section.

In one embodiment, the diameter of the straight extending section is greater than the diameter of the bent section; or, the diameter of an end of the straight extending section that is far away from the bent section is greater than the diameter of the bent section.

A delivery system includes an implantable instrument and the above delivery device. The bent section of the regulating member of the delivery device is able to abut against the implantable instrument.

An end of the regulating member of the above delivery device includes a bent section. The first driving assembly drives the regulating member to enable the bent section to abut against the implantable instrument. In an abutment state, the regulating member is continued to be pulled axially to the proximal end through the first driving assembly, so that the bent section drives the distal end of the implantable instrument to move towards the proximal end, and the implantable instrument restores the expanded state and is formed.

DETAILED DESCRIPTION OF THE EMBODIMENTS

In order to make the foregoing objectives, features and advantages of the embodiments more obvious and understandable, the specific implementation modes of the embodiments are described in detail with reference to the accompanying drawings. Many specific details are described in the following descriptions to facilitate full understanding of the embodiments. However, the embodiments can be implemented in a variety of other ways than those described herein, and those skilled in the art can make similar improvements without departing from the connotation of the embodiments. Therefore, the embodiments is not limited by specific implementations disclosed below.

Unless otherwise defined, all technical and scientific terms used herein are the same as meanings of general understandings of those skilled in the art of the disclosure belongs. The terms used in the description of the present invention herein are merely to describe the specific embodiments, not intended to limit the present invention.

In the field of interventional medical instruments, "distal end" is defined as an end far from an operator during surgery, and "proximal end" is defined as an end close to the operator during surgery. "Axial direction" refers to a direction parallel to a connecting line between a center of a distal end of a medical instrument and a center of a proximal end, and "radial direction" refers to a direction perpendicular to the above axial direction.

An occluder serving as an implantable instrument is taken as an example to describe a delivery device and a delivery system.

Figure 1:
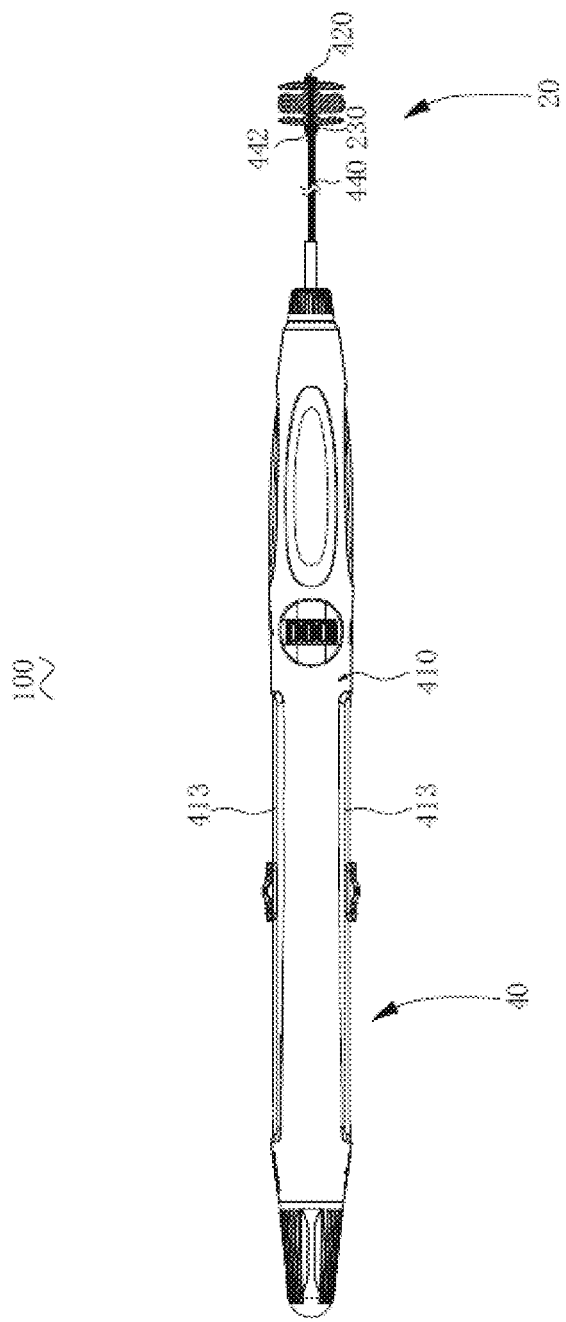
FIG. 1 is a schematic structural diagram of an occlusion system according to one embodiment.

Referring to FIG. 1, a delivery system 100 according to one embodiment includes an implantable instrument and a delivery device 40. The implantable instrument is an occluder 20. The occluder 20 is detachably connected with the delivery device 40. After the occluder 20 is pushed to a diseased position in an organism through the delivery device 40 and released, the connection between the occluder 20 and the delivery device 40 is cut off, and the delivery device 40 is withdrawn from the organism to complete the implantation operation.

Figure 2:
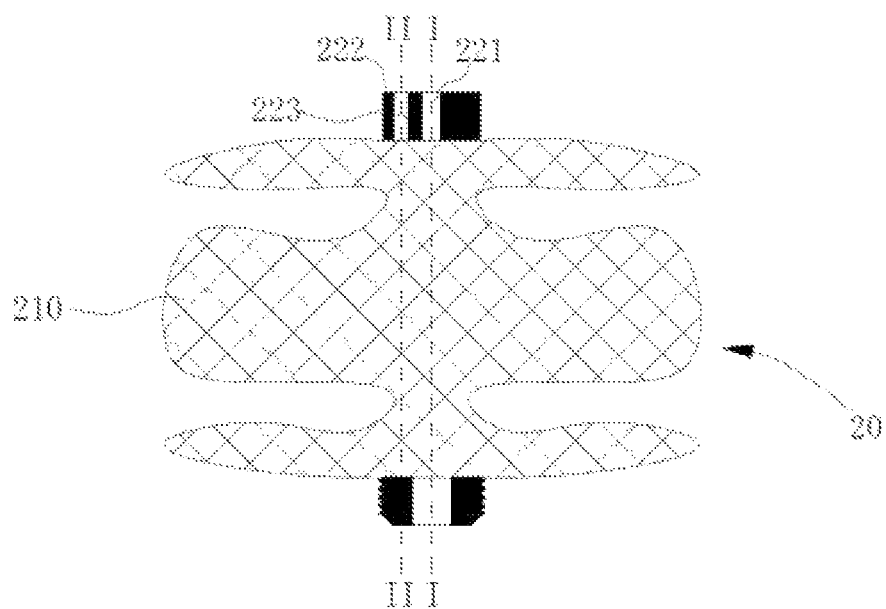
FIG. 2 is a schematic structural diagram of an occluder according to one embodiment.

Referring to FIG. 2, in one embodiment, the occluder 20 includes an absorbable occlusion frame 210. The occlusion frame 210 is a net structure formed by weaving a polymer material or by other methods such as 3D printing.

In one embodiment, a material of the occlusion frame 210 is at least one of poly-L-lactic acid, poly-dl-lactide, polyglycolic acid, a polylactic acid-hydroxyacetic acid copolymer, polyhydroxy fatty acid ester, polydioxanone, polycaprolactone, polyglucose acid, polyhydroxybutyrate, polyanhydride, polyphosphoester, polyglycolic acid and polydioxanone.

In one embodiment, a material of the occlusion frame 210 is a copolymer formed by copolymerizing at least two of monomers of poly-L-lactic acid, poly-dl-lactide, polyglycolic acid, a polylactic acid-hydroxyacetic acid copolymer, polyhydroxy fatty acid ester, polydioxanone, polycaprolactone, polyglucose acid, polyhydroxybutyrate, polyanhydride, polyphosphoester, polyglycolic acid and polydioxanone.

The above polymer material has excellent biocompatibility and can be degraded in the organism, so that the occluder 20 can be degraded without residues after completing its intended use.

Figure 3:
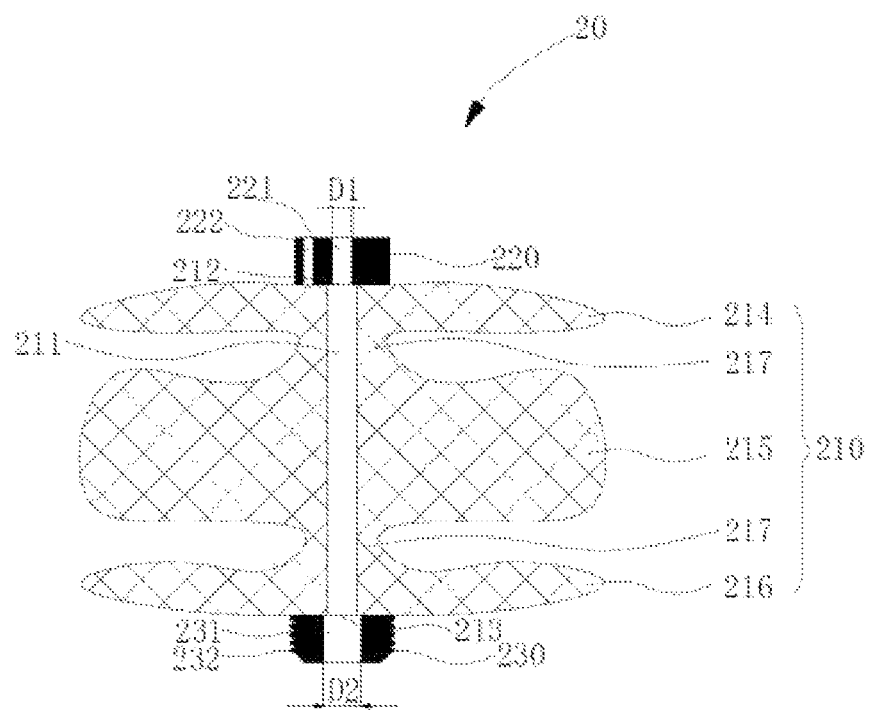
FIG. 3 is a schematic structural diagram of an occluder according to one embodiment (an inner cavity is shown)

Referring to FIG. 3, the occlusion frame 210 includes an inner cavity 211, and the occlusion frame 210 includes a first opening 212 and a second opening 213 which are opposite to each other (the inner cavity 211 is located inside the occlusion frame 210. For convenience, the inner cavity 211 is roughly drawn in FIG. 3 to show positional relationships between the inner cavity 211 and the first opening 212, as well as the second opening 213). The first opening 212 and the second opening 213 are respectively located at a distal end and a proximal end of the occlusion frame 210, and the inner cavity 211, the first opening 212 and the second opening 213 are communicated to form a path. In one embodiment, a plurality of braided wires are braided to form the occlusion frame 210, and two free ends of the plurality of braided wires are respectively closed to form the first opening 212 and the second opening 213. In one embodiment, the two free ends of the plurality of braided wires are closed with annular closing members respectively.

In one embodiment, the occluder 20 also includes a first occlusion head 220 and a second occlusion head 230. The first occlusion head 220 and the second occlusion head 230 are respectively arranged at two opposite ends of the occlusion frame 210. The first occlusion head 220 is provided with a first through hole 221, and the first through hole 221 is communicated with the first opening 212. The second occlusion head 230 is provided with a second through hole 231, and the second through hole 231 is communicated with the second opening 213.

In one embodiment, the first occlusion head 220 and the second occlusion head 230 are respectively configured to close the two free ends of the plurality of braided wires, and form the first opening 212 which communicate with the first through hole 221 and the second opening 213 which communicate with the second through hole 231. For example, the first occlusion head 220 and the second occlusion head 230 form a receiving slot or a receiving cavity respectively. The two free ends of the plurality of braided wires are respectively embedded and fixed in the receiving slot (or the receiving cavity) of the first occlusion head 220 and the receiving slot (or the receiving cavity) of the second occlusion head 230, and form the first opening 212 which communicated with the first through hole 221 and the second opening 213 which communicated with the second through hole 231.

In one embodiment, the first occlusion head 220 and the second occlusion head 230 are both located outside the occlusion frame 210. This arrangement makes it convenient for machining.

In one embodiment, the first occlusion head 220 and the second occlusion head 230 are both located inside the occlusion frame 210. This arrangement is conducive to avoiding thrombosis, and is conducive to preventing the first occlusion head 220 and/or the second occlusion head 230 from scratching the tissue due to an improper operation during a release process.

In one embodiment, the first occlusion head 220 is arranged inside the occlusion frame 210, and the second occlusion head 230 is arranged outside the occlusion frame 210, so that the first occlusion head 220 is prevented from scratching the tissue, and it is convenient for detachable connection between the delivery device 40 and the second occlusion head 230.

Figure 4:
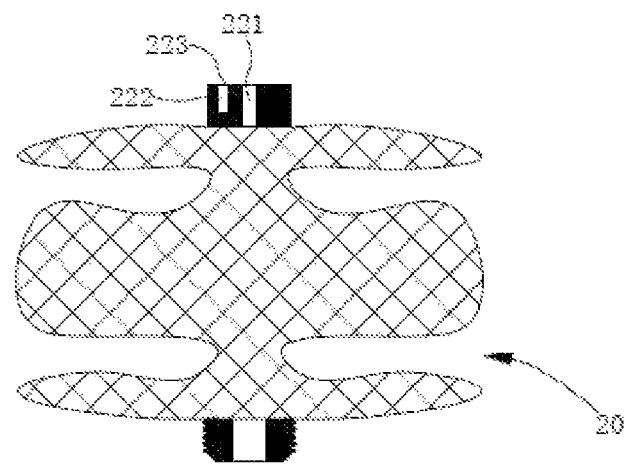
FIG. 4 is a schematic structural diagram of an occluder according to another embodiment.

Referring to FIG. 2 and FIG. 3, the first occlusion head 220 is provided with a receiving portion 222. The receiving portion 222 is configured to assist in the forming of the occluder 20. In one embodiment, the receiving portion 222 is a through hole. In one embodiment, as shown in FIG. 4, the receiving portion 222 is a groove. When the receiving portion 222 is a groove, an open end of the receiving portion 222 is located at the distal end.

The receiving portion 222 is located on a side of the first through hole 221. A spacer portion 223 is arranged between the receiving portion 222 and the first through hole 221.

An axial central axis I-I of the first through hole 221 and an axial central axis II-II of the receiving portion 222 are not on the same straight line. As shown in FIG. 2, in one embodiment, the axial central axis I-I of the first through hole 221 is parallel to the axial central axis II-II of the receiving portion 222. In other embodiments, the central axis I-I and the central axis II-II are not parallel.

In one embodiment, an external thread 232 is formed on an outer wall of the second occlusion head 230, as shown in FIG. 3, to facilitate connection with the delivery device 40.

In one embodiment, the materials of the first occlusion head 220 and the second occlusion head 230 are degradable polymer materials, which makes the occluder 20 completely absorbable in the organism. The materials of the first occlusion head 220 and the second occlusion head 230 may be the same as or different from the material of the occlusion frame 210.

The first occlusion head 220 and the second occlusion head 230 are substantially rigid polymer tubes. Since the occlusion frame 210 is relatively soft, this arrangement of the first occlusion head 220 and the second occlusion head 230 is conducive to the loading, pushing, releasing and shaping of the occluder 20.

An aperture of the first through hole 221 is D1, and an aperture of the second through hole 231 is D2.

Continuing to refer to FIG. 3, the occlusion frame 210 includes a first occlusion unit 214, a middle occlusion unit 215 and a second occlusion unit 216. Two opposite ends of the middle occlusion unit 215 are respectively connected (directly or indirectly) with the first occlusion unit 214 and the second occlusion unit 216. The first opening 212 is formed on the first occlusion unit 214, and the second opening 213 is formed on the second occlusion unit 216.

In one embodiment, the occlusion frame 210 also includes a waist portion 217. The number of the waist portion 217 is two. Two ends of one waist portion 217 are respectively connected with the first occlusion unit 214 and the middle occlusion unit 215, and two ends of the other waist portion 217 are respectively connected with the middle occlusion unit 215 and the second occlusion unit 216. Radial dimensions of both the waist portions 217 are smaller than those of the first occlusion unit 214, the middle occlusion unit 215 and the second occlusion unit 216.

In one embodiment, the axial length of the middle occlusion unit 215 is greater than the axial length of the first occlusion unit 214 and the axial length of the second occlusion unit 216, so that after implantation, the contact area between the occluder 20 and the diseased position (such as a vascular wall) is larger, which is conducive to improving the anchoring performance of the occluder 20 at the diseased position and maintaining the morphology of the occluder 20.

In one embodiment, the first occlusion unit 214 and the second occlusion unit 216 are disc-shaped. The middle occlusion unit 215 is columnar. The columnar middle occlusion unit 215 is connected with the disc-shaped first occlusion unit 214 and second occlusion unit 216 through the waist portion 217 with the smaller radial dimension. In one aspect, the combination of the columnar middle occlusion unit 215 with the disc-shaped first occlusion unit 214 and second occlusion unit 216 ensures the contact area with the diseased position (such as the vascular wall). In another aspect, the middle occlusion unit 215 is connected with both the first occlusion unit 214 and the second occlusion unit 216 through the waist portion 217 with the smaller radial dimension, so that angles between the first occlusion unit 214 and the middle occlusion unit 215, and between the middle occlusion unit 215 and the second occlusion unit 216 can be adjusted, which helps the occluder 20 to adapt to diseased positions of different shapes to adapt to different individuals. In still another aspect, the above connection method makes the occluder 20 more flexible, which is conducive to smooth delivery to the diseased position through curved blood vessels.

In other embodiment, at least one of the two waist portions 217 may be omitted.

Figure 5:
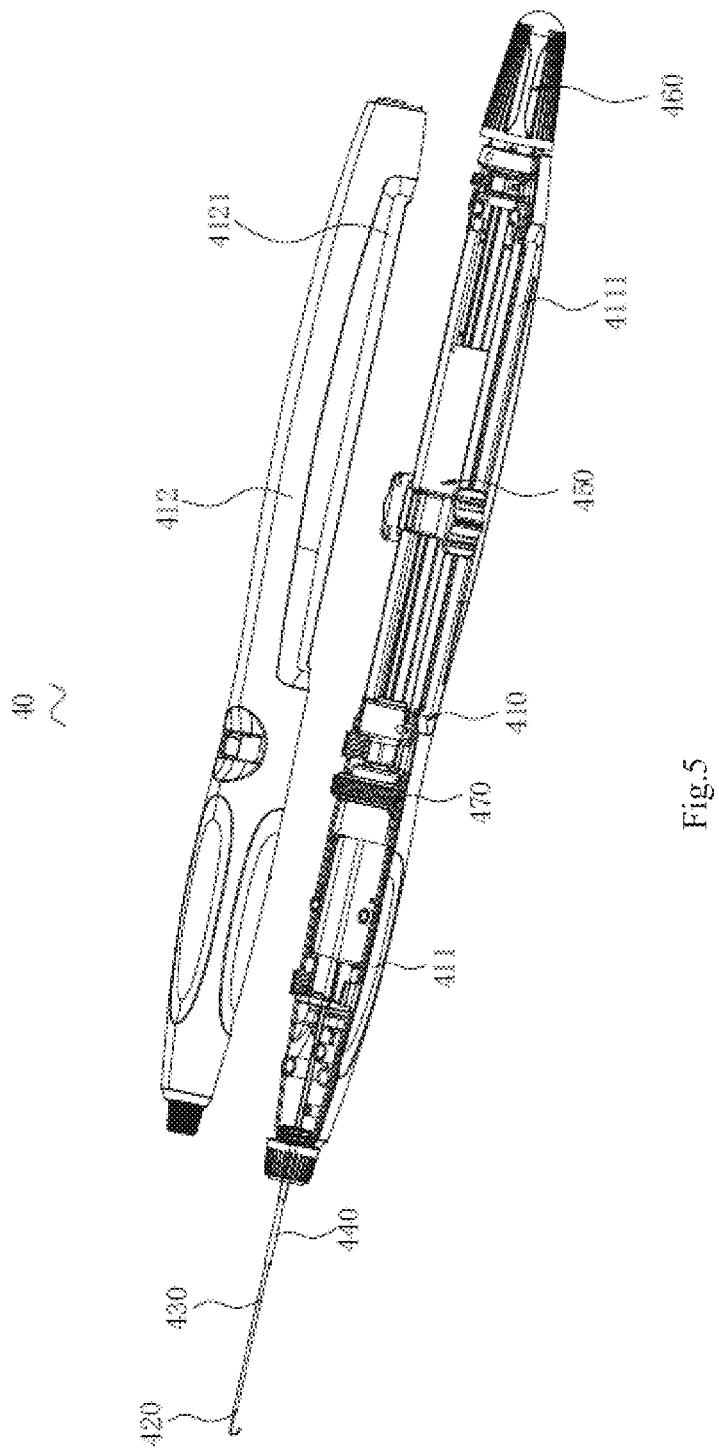
FIG. 5 is a schematic exploded diagram of a delivery device according to one embodiment.

Referring to FIG. 1 and FIG. 5, the delivery device 40 includes an operating handle 410, a regulating member 420, a push member 430 and a delivery member 440. The regulating member 420 has a distal end and a proximal end, and the proximal end of the regulating member 420 is connected with the operating handle 410. The push member 430 has a distal end and a proximal end, and the proximal end of the push member 430 is connected with the operating handle 410. The delivery member 440 has a distal end and a proximal end, and the proximal end of the delivery member 440 is connected with the operating handle 410. The loading, pushing, releasing and forming of the occluder 20 are realized by means of controlling the displacements of the regulating member 420, the push member 430 and the delivery member 440 on the operating handle 410. The push member 430 is movably received in the delivery member 440, and the regulating member 420 is movably received in the push member 430.

The operating handle 410 includes a shell 411 and an upper cover 412. The shell 411 and the upper cover 412 are detachably connected. When the shell 411 and the upper cover 412 are connected, the shell 411 and the upper cover 412 form an accommodating cavity.

An edge of the shell 411 is provided with a first groove 4111. An edge of the upper cover 412 is provided with a second groove 4121. The first groove 4111 and the second groove 4121 form a rail 413, as shown in FIG. 1. In one embodiment, there are two first grooves 4111 and second grooves 4121, which form two opposite and parallel rails 413.

Figure 6:
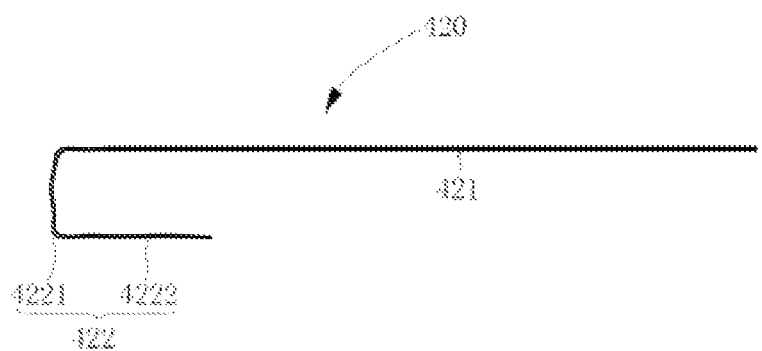
FIG. 6 is a schematic structural diagram of a regulating member according to one embodiment.

Referring to FIG. 6, the regulating member 420 is a slender rod piece. For example, the regulating member 420 is a slender metal rod or wire with certain rigidity.

In one embodiment, the material of the regulating member 420 is a shape memory metal material or a shape memory alloy material. In one embodiment, the material of the regulating member 420 is nickel titanium alloy.

The regulating member 420 includes a straight extending section 421 and a bent section 422 connected with the straight extending section 421. In a natural state, the bent section 422 is bent relative to the straight extending section 421.

In one embodiment, the bent section 422 includes a first bent portion 4221 and a second bent portion 4222 connected with the first bent portion 4221. An end of the first bent portion 4221 that is far away from the second bent portion 4222 is connected with the straight extending section 421, and an end of the second bent portion 4222 that is far away from the first bent portion 4221 is a free end. In the natural state, the first bent portion 4221 is not parallel to the straight extending section 421, so that the bent section 422 is bent relative to the straight extending section 421. Furthermore, the second bent portion 4222 is bent relative to the first bent portion 4221.

In one embodiment, in the natural state, an included angle between the first bent portion 4221 and the straight extending section 421 is a right angle, and an included angle between the second bent portion 4222 and the first bent portion 4221 is a right angle, so that the straight extending section 421 is parallel to the second bent portion 4222.

In other embodiments, in the natural state, the included angle between the first bent portion 4221 and the straight extending section 421 is not limited to a right angle, and the included angle between the second bent portion 4222 and the first bent portion 4221 is not limited to a right angle, as long as it is ensured that the whole bent portion 422 is bent relative to the straight extending section 421, and the second bent portion 4222 is bent relative to the first bent portion 4221, so that when the second bent portion 4222 is received in the receiving portion 222, the first bent portion 4221 and the spacer portion 223 of the first occlusion head 220 can hook under force.

When the regulating member 420 is restrained, for example, when the regulating member is restrained in a lumen structure, the bent section 422 is roughly straightened; or, a free end of the bent section 422 is received in the lumen structure in a manner such that it is axially away from the straight extending section 421. When the restriction disappears, the bent section 422 restores the natural state, that is, the bent form relative to the straight extending section 421.

An end of the slender shape memory metal rod piece or wire or the shape memory alloy rod piece or wire is bent twice and shaped to obtain the regulating member 420 of an integrated structure.

It can be understood that in other embodiments, the straight extending section 421, the first bent portion 4221 and the second bent portion 4222 can be connected respectively, for example, by welding or bonding to form the regulating member 420.

Figure 7:
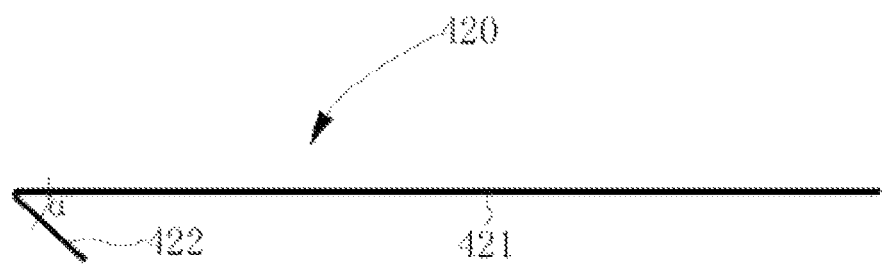
FIG. 7 is a schematic structural diagram of a regulating member according to another embodiment.

In one embodiment, referring to FIG. 7, the regulating member 420 includes a straight extending section 421 and a bent section 422 connected with the straight extending section 421. In a natural state, the bent section 422 is bent relative to the straight extending section 421. The bent section 422 itself is a straight rod or a straight metal wire, that is, the bent section 422 of this embodiment does not include a first bent portion 4221 and a second bent portion 4222. The included angle α between the bent section 422 and the straight extending section 421 is less than 90°. The bent section 422 is at least partially received in the receiving portion 222, so that connection portions of the bent section 422 and the straight extending section 421 can be hooked with the spacer portion 223 of the first occlusion head 220. In this embodiment, the metal rod or wire is bent once and shaped to form the regulating member 420.

In one embodiment, the regulating member 420 is an alloy rod or alloy wire with an equal diameter. In one embodiment, a diameter of the regulating member 420 is 0.3-0.35 mm. The regulating member 420 with the diameter of 0.3-0.35 mm is used, so that the regulating member 420 has sufficient strength. On one hand, it is convenient to adjust the occluder 20. On the other hand, it is advantageous to avoid breakage of the regulating member 420, making the connection between the regulating member 420 and other components more reliable.

In one embodiment, the regulating member 420 is an alloy rod or alloy wire with unequal diameters, and includes a first portion with a larger diameter and a second portion with a smaller diameter.

In one embodiment, the first portion with a larger diameter is the straight extending section 421, and the second portion with a smaller diameter is the bent section 422.

In another embodiment, as shown in FIG. 6 and FIG. 7, in the straight extending section 421, section L1 is a rod or wire with an equal diameter, and the other region of the straight extending section 421 other than section L1 and the bent section 422 are another rod or wire with an equal diameter. The diameter of section L1 is larger than that of the other section, that is, section L1 is the first portion with a larger diameter, and the other section is the second portion with a smaller diameter. Section L1 is located at an end of the regulating member 420 that is far away from the bent section 422. An end of the straight extending section 421 of the regulating member 420 that is far away from the bent section 422 is connected with other components of the delivery device 40. The diameter of section L1 is larger, which is conducive to avoiding the breakage of the regulating member 420, so that the connection between the regulating member 420 and other components is reliable. During the delivery process, the region of the regulating member 420 other than section L1 will extend out of the occluder 20, and at least part of this region is a portion that contacts the first occlusion head 220. The diameter of this region is smaller, making the resilience of this region low, which is conducive to avoiding damage to the tissue, and avoiding damage to the first occlusion head 220 due to excessive resilience of the bent section 422.

In one embodiment, the diameter of the first portion with a larger diameter is 0.3-0.35 mm, and the diameter of the second portion with a smaller diameter is 0.18-0.22 mm, so as to give consideration to the connection strength and avoiding excessive resilience of the second portion.

In one embodiment, when the first portion with a larger diameter is section L1, the ratio of the axial length of section L1 to the axial length (which is the sum of the axial length of the straight extending section 421 and the axial length of the bent section 422 that is straightened) of the regulating member 420 is (90-99): 100, so that the regulating member 420 has certain pushing performance, so as to facilitate the adjustment of the occluder 20.

Figure 8:
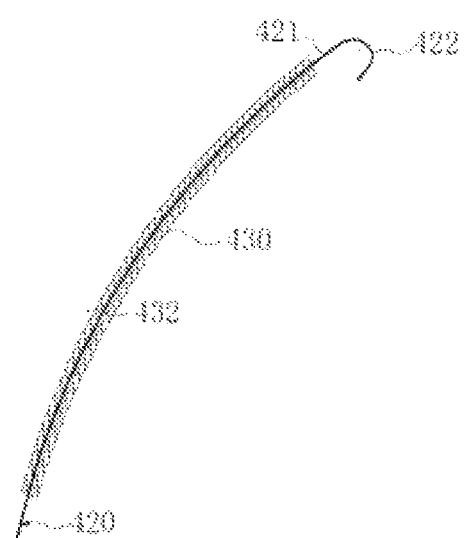
FIG. 8 is a schematic diagram showing a positional relationship between a regulating member and a push member according to one embodiment.
Figure 9A:
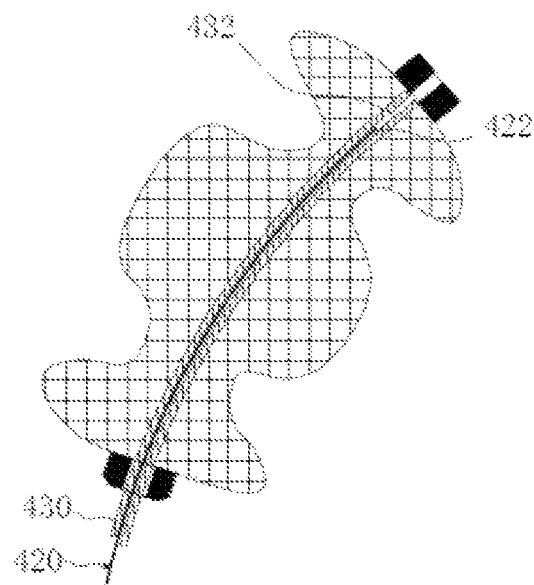
FIG. 9*a* and FIG. 9*b* are schematic diagrams of different relative positional relationships between an occluder and a regulating member according to one embodiment.
Figure 9B:
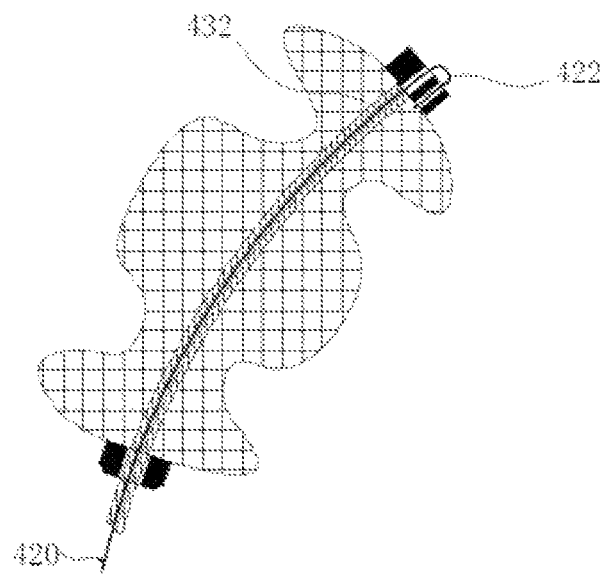

Referring to FIG. 8, the push member 430 is a hollow pipe fitting. The push member 430 includes an inner cavity 432 extending axially from the distal end to the proximal end. The regulating member 420 is movably received in the inner cavity 432 of the push member 430, that is, the regulating member 420 is movably threaded through the push member 430. When the bent section 422 of the regulating member 420 is located in the inner cavity 432, the bent section 422 is roughly straightened, as shown in FIG. 9a. Alternatively, the free end of the bent section 422 is received in the push member 430 in a manner of being axially away from the straight extending section 421. When the bent section 422 of the regulating member 420 is located outside the inner cavity 432 and is no longer restrained, the bent section 422 restores to its natural bent state, as shown in FIG. 8 and FIG. 9b.

Figure 10:
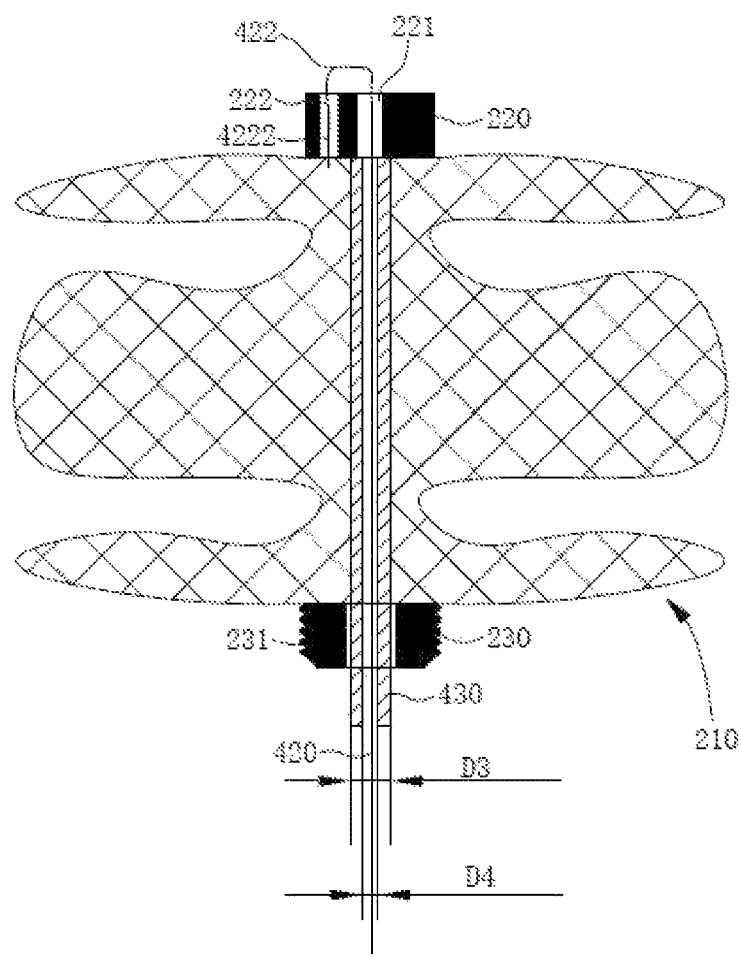
FIG. 10 is a schematic diagram of a positional relationship between an occluder and a regulating member, as well as a push member according to one embodiment.

When the occluder 20 is loaded in the delivery device 40, the push member 430 can be moved from the second through hole 231 of the second occlusion head 230 of the occluder 20 to the path formed by the first opening 212, the inner cavity 211 and the second opening 213 of the occlusion frame 210 by means of controlling the operating handle 410. The push member 430 can be moved from the second through hole 231 to the distal end of the push member 430 to abut against an end surface of the proximal end of the first occlusion head 220. The abutment state is shown in FIG. 10, or the distal end of the push member 430 extends into the first occlusion head 220 and abuts against the first occlusion head 220. In addition, the bent section 422 of the regulating member 420 extends out of the occluder 20 from the push member 430 through the first through hole 221 of the first occlusion head 220. The second bent portion 4222 of the bent section 422 extends into the receiving portion 222.

Referring to FIG. 10, the outer diameter of the push member 430 is D3, and the inner diameter is D4. The outer diameter of the regulating member 420 is D5 (not shown in FIG. 10). Referring to FIG. 3 and FIG. 10, D2>D3>D1>D4>D5, so that the occluder 20, the regulating member 420 and the push member 430 cooperate to achieve the loading, pushing, releasing and shaping of the occluder 20.

It should be noted that when the first through hole 221 and the second through hole 231 are irregularly shaped through holes, the aperture D1 of the first through hole 221 refers to the location having the smallest inner diameter. The diameter D2 of the second through hole 231 also refers to an aperture of the smallest portion.

Returning to FIG. 1, the delivery member 440 is a hollow pipe fitting. In one embodiment, the delivery member 440 is a hollow stainless steel spring pipe. In one embodiment, the delivery member 440 is a hollow nickel titanium cable.

In one embodiment, the distal end of the delivery member 440 is provided with a connection portion 442, and an inner wall of the connection portion 442 is provided with an internal thread. By means of cooperation between the internal thread and the external thread 232 of the second occlusion head 230, the second occlusion head 230 is detachably connected with the delivery member 440.

Referring to FIG. 5 again, the proximal end of the delivery member 440 extends into the operating handle 410 and is fixedly connected with the operating handle 410. The push member 430 is movably threaded through the delivery member 440. The regulating member 420 is movably threaded through the push member 430.

The delivery device 40 also includes a first driving assembly 450 and a second driving assembly 460.

Figure 11:
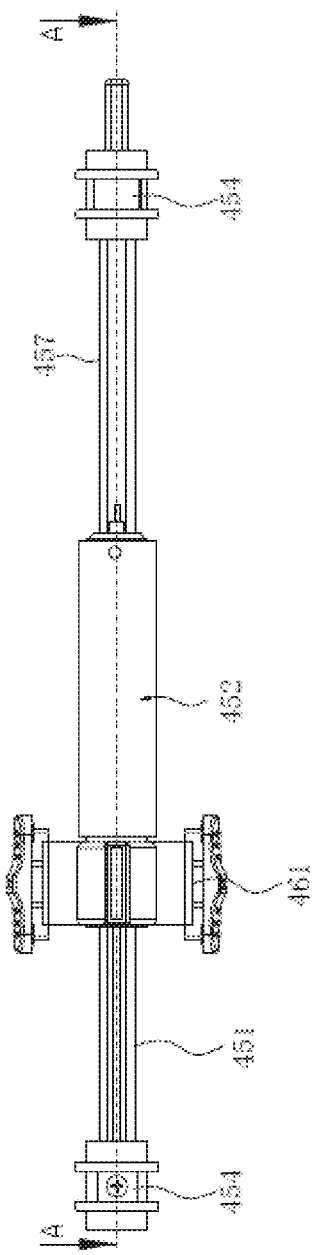
FIG. 11 is a schematic structural diagram of a partial structure of a first driving assembly and a second driving assembly according to one embodiment.
Figure 12:
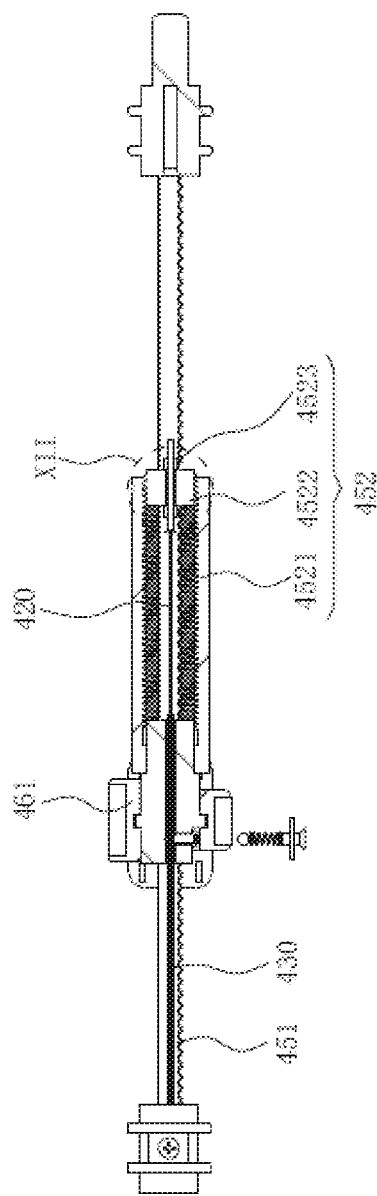
FIG. 12 is a sectional view of FIG. 11.
Figure 14:
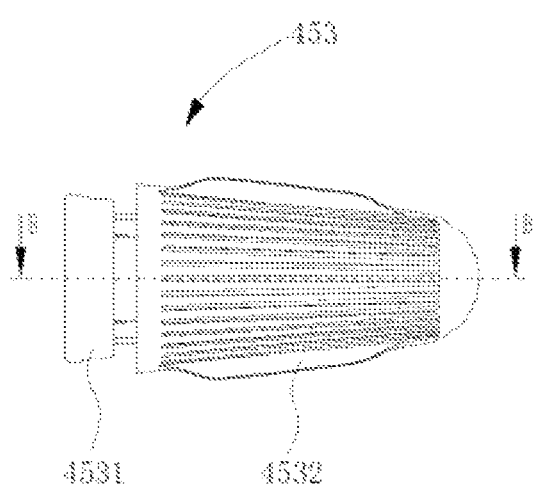
FIG. 14 is a schematic structural diagram of a second rotating member according to one embodiment.

Referring to FIG. 11 and FIG. 12 together, the first driving assembly 450 includes a guide rail 451, a first rotating member 452 and a second rotating member 453 (see FIG. 14). The guide rail 451 is received in the accommodating cavity of the operating handle 410, and the guide rail 451 extends axially. The guide rail 451 is parallel to the rail 413.

Figure 13:
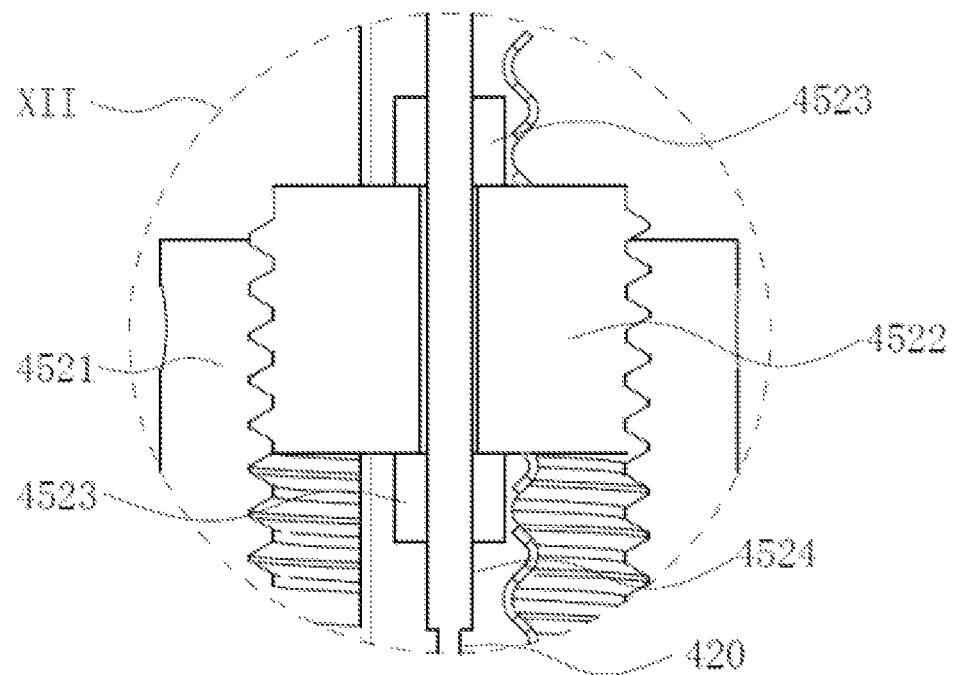
FIG. 13 is a partially enlarged diagram of a portion of FIG. 12.

As shown in FIG. 12, the first rotating member 452 includes a fixed portion 4521, a rotary portion 4522 and an abutment portion 4523. The fixed portion 4521 is received in the accommodating cavity of the operating handle 410, and the rotary portion 4522 is rotatable and axially movable relative to the fixed portion 4521. The rotary portion 4522 is provided with a through hole extending axially from one end to the other end. In one embodiment, the regulating member 420 extends into the push member 430, and the proximal end of the regulating member 420 extends into the through hole of the rotary portion 4522. In addition, a space is formed between the regulating member 420 and a hole wall of the through hole of the rotary portion 4522, and the regulating member 420 is not fixedly connected with the rotary portion 4522. Referring to FIG. 13, there are two abutment portions 4523. The two abutment portions 4523 surround the regulating member 420 and are fixedly connected with the regulating member 420. In addition, the two abutment portions 4523 are located on two sides of the rotary portion 4522. The two abutment portions 4523 are not fixedly connected with the rotary portion 4522. When the rotary portion 4522 rotates relative to the fixed portion 4521, the rotary portion 4522 synchronously moves axially and pushes against the abutment portions 4523, so that the abutment portions 4523 move axially in the same direction, so as to drive the regulating member 420 to move axially, and the regulating member 420 does not rotate.

In one embodiment, an inner wall of the fixed portion 4521 is provided with an internal thread, and an outer wall of the rotary portion 4522 is provided with an external thread. The internal thread cooperates with the external thread to enable the rotary portion 4522 to rotate and axially move relative to the fixed portion 4521.

Referring to FIG. 13, in one embodiment, the first rotating member 452 also includes a reinforcement tube 4524. The proximal end of the regulating member 420 is fixedly connected with the reinforcement tube 4524. For example, the proximal end of the regulating member 420 extends into the reinforcement tube 4524 and is fixedly connected with the reinforcement tube 4524, or the reinforcement tube 4524 surrounds the proximal end of the regulating member 420 and covers an end surface of the proximal end of the regulating member 420, and the reinforcement tube 4524 is fixedly connected with the regulating member 420. The reinforcement tube 4524 extends into the through hole of the rotary portion 4522, leaving a space from the hole wall of the through hole. The two abutment portions 4523 surround the reinforcement tube 4524 and are fixedly connected with the reinforcement tube 4524, and the two abutment portions 4523 are located at two ends of the rotary portion 4522.

Since the radial dimension (such as the diameter) of the regulating member 420 is relatively small, the reinforcement tube 4524 is arranged to facilitate the connection between the regulating member 420 and the abutment portions 4523, and to improve the connection strength between the regulating member 420 and the abutment portions 4523, so that the regulating member 420 is reliably threaded through the through hole of the rotary portion 4522.

It can be understood that in other embodiments, the reinforcement tube 4524 may be omitted. When the reinforcement tube 4524 is omitted, the regulating member 420 is reliably connected with the abutment portions 4523 in other ways. For example, the regulating member 420 is a metal wire or metal rod with a non-uniform outer diameter. The outer diameter of the proximal end of the regulating member 420 is relatively large, so that the regulating member 420 is reliably connected with the abutment portions 4523.

Figure 15:
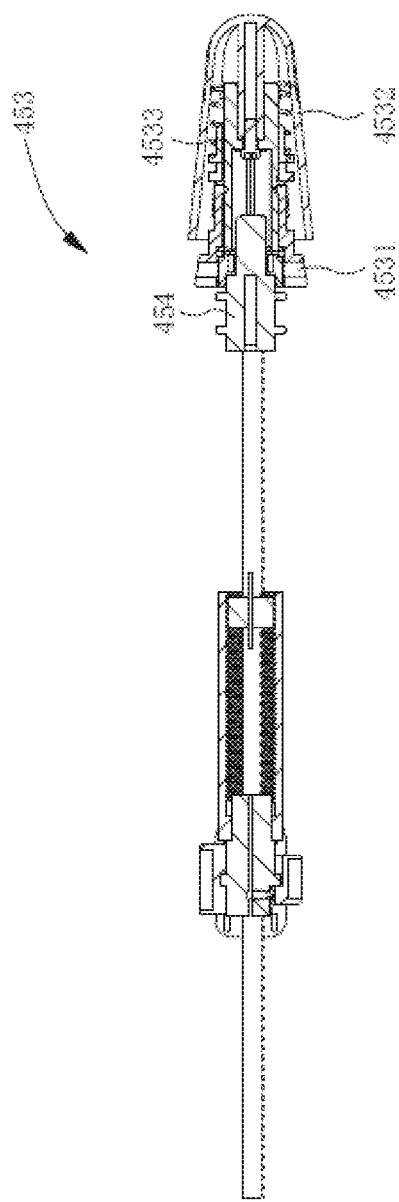
FIG. 15 is a schematic sectional structural diagram of a first driving assembly and a second driving assembly according to one embodiment.

Referring to FIG. 14 and FIG. 15 together, the second rotating member 453 includes a base 4531, a screw cap 4532 and a regulating rod 4533. The base 4531 is connected with the shell 411 and the upper cover 412, and the base 4531 is rotatably connected with the operating handle 410. The regulating rod 4533 is inserted into the base 4531, and the screw cap 4532 surrounds the regulating rod 4533 and the base 4531. The second rotating member 453 is rotatable relative to the operating handle 410.

In one embodiment, the first driving assembly 450 also includes two connection members 454, as shown in FIG. 11 and FIG. 15. The rotary portion 4522 is provided with a fixing hole. The guide rail 451 is threaded through the fixing hole, and two ends of the guide rail 451 are respectively connected with the two connection members 454. Referring to FIG. 15, the connection member 454 located at the proximal end extends into the base 4531 and is fixedly connected with the base 4531. The second rotating member 453 is rotated to drive the guide rail 451 to rotate, so as to drive the rotary portion 4522 to rotate and axially move relative to the fixed portion 4521.

In one embodiment, the first driving assembly 450 also includes a balance sliding rail 457. The balance sliding rail 457 is parallel to the guide rail 451. In this embodiment, there are two fixing holes on the rotary portion 4522. The guide rail 451 and the balance sliding rail 457 extend into the two fixing holes respectively, and the guide rail 451 and the balance sliding rail 457 extend toward the proximal end. The two fixing holes are located on two sides of the through hole. That is, during assembly, the regulating member 420 is located between the guide rail 451 and the balance sliding rail 457. When the second rotating member 453 is rotated, the guide rail 451 and the balance sliding rail 457 rotate simultaneously.

Referring further to FIG. 11 and FIG. 12, the second driving assembly 460 includes a sliding button 461. The sliding button 461 at least partially protrudes from the rail 413. The sliding button 461 is connected with the guide rail 451 and the balance sliding rail 457, and the sliding button 461 can move axially along the guide rail 451 and the balance sliding rail 457.

In one embodiment, the sliding button 461 includes two operating portions. The two operating portions extend out of the two rails 413 and are located outside the operating handle 410.

In one embodiment, the sliding button 461 is provided with two through holes, and the guide rail 451 and the balance sliding rail 457 are respectively threaded through the sliding button 461 through the two through holes.

The balance sliding rail 457 is arranged to make the sliding button 461 move axially more stably, which is conducive to improving the stability of operation. It can be understood that the balance sliding rail 457 may be omitted to make the internal structure of the operating handle 410 more compact.

The sliding button 461 is also provided with another through hole. An end of the push member 430 extends into the through hole from the operating handle 410, and is fixedly connected with the sliding button 461 (as shown in FIG. 12), so that the sliding button 461 drives the push member 430 to move axially when it moves axially.

Returning to FIG. 12, in one embodiment, the fixed portion 4521 is fixedly connected with the sliding button 461, so that when the sliding button 461 moves axially along the guide rail 451, the rotating member 452 is driven to move axially, and the push member 430 and the regulating member 420 can move axially at the same time. The operation is more convenient and efficient. In this embodiment, the first driving assembly 450 can independently drive the regulating member 420 to move axially, and the second driving assembly 460 can simultaneously drive the regulating member 420 and the push member 430 to move axially.

It can be understood that in other embodiments, the fixed portion 4521 is not fixedly connected with the sliding button 461. The first driving assembly 450 independently drives the regulating member 420 to move axially, and the second driving assembly 460 independently drives the push member 430 to move axially.

Figure 16A:
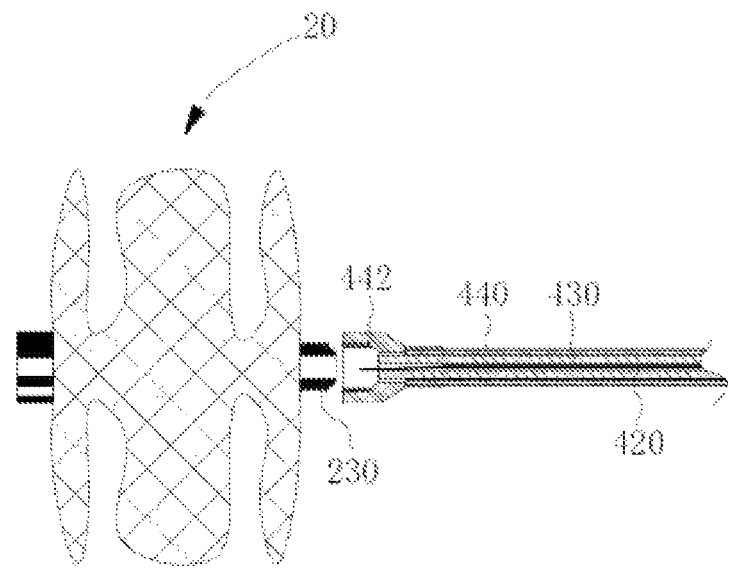
FIG. 16*a* and FIG. 16*b* are schematic diagrams of a disconnected state and a connected state between an occluder and a delivery device according to one embodiment.
Figure 16B:
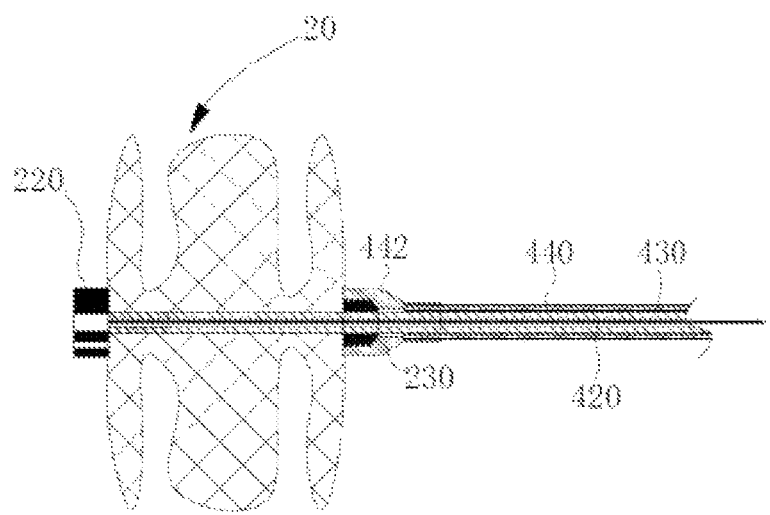
Figure 16C:
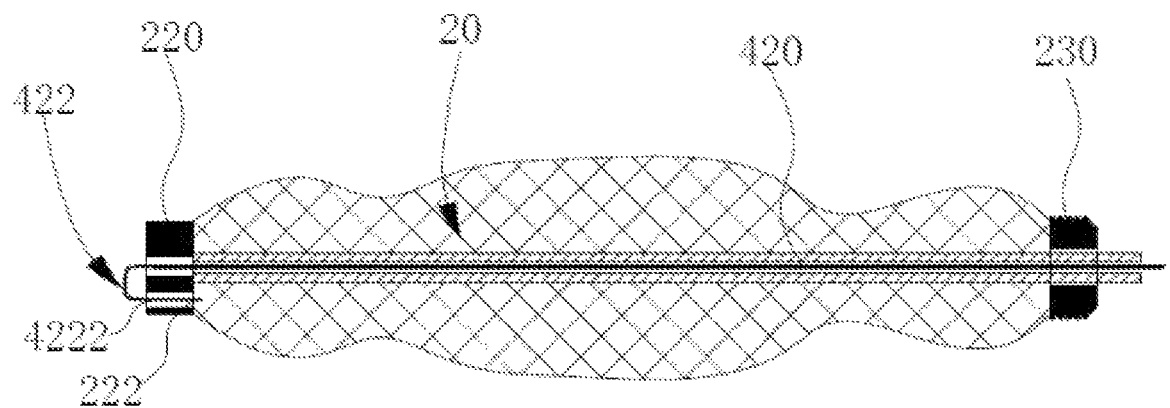
FIG. 16*c* and FIG. 16*d* are schematic diagrams illustrating that the occluder of one embodiment is in a stretched state.

In an implantation operation, first of all, referring to FIG. 16a and FIG. 16b together, the connection portion 442 of the delivery member 440 (internally provided with the regulating member 420 and the push member 430 in a penetrating manner) is connected with the second occlusion head 230 of the occluder 20. When the sliding button 461 is not fixedly connected with the fixed portion 4521, the sliding button 461 is operated to make the push member 430 enter the path formed by the first through hole 221, the first opening 212, the inner cavity 211 of the occlusion frame 210, the second opening 213 and the second through hole 231 from the second occlusion head 230 and continue to translate to the distal end of the push member 430 to abut against the first occlusion head 220. The push member 430 is continued to move towards the distal end to straighten the occluder 20, so that the occluder 20 is in a stretched state. The second rotating member 453 is rotated to drive the regulating member 420 to move axially, so that the regulating member 420 moves axially along the inner cavity 432 of the push member 430 until the regulating member 420 extends out of the occluder 20 from the first occlusion head 220, and the bent section 422 restores its natural appearance. The second bent portion 4222 of the bent section 422 further extends into the receiving portion 222, as shown in FIG. 16*c*.

Figure 16D:
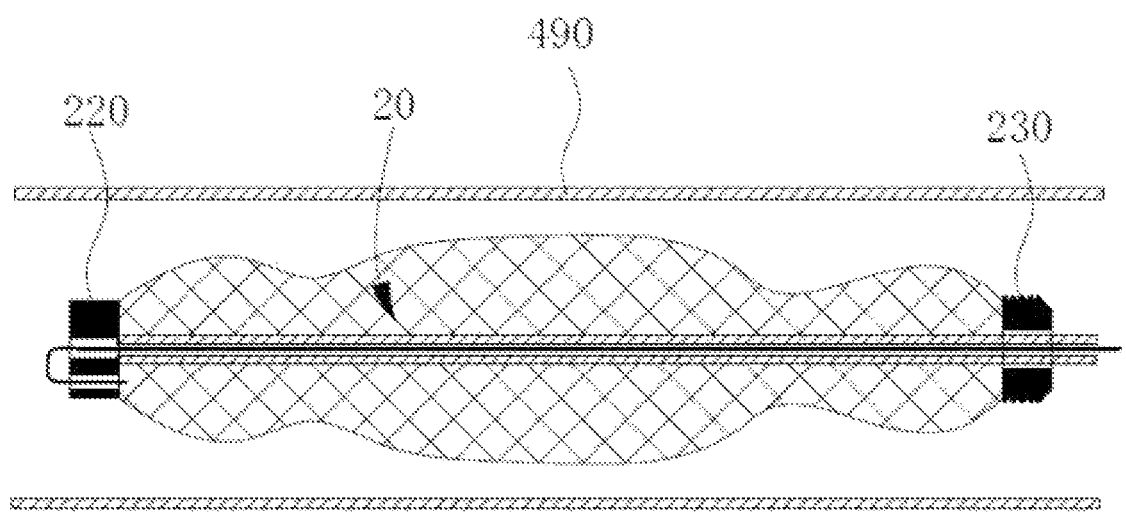

When the sliding button 461 is fixedly connected with the fixed portion 4521, the sliding button 461 is operated to move along the guide rail 451 and the rail 413, so as to drive the regulating member 420 and the push member 430 together to enter the path formed by the first through hole 221, the first opening 212, the inner cavity 211 of the occlusion frame 210, the second opening 213 and the second through hole 231 from the second occlusion head 230, and to continuously translate to the distal end of the push member 430 to abut against the first occlusion head 220. Then the push member 430 and the regulating member 420 are continued to move towards the distal end to straighten the occluder 20, so that the occluder 20 is in a stretched state. When the occluder 20 is in the stretched state, the position of the sliding button 461 is kept stationary. The second rotating member 453 is rotated to drive the regulating member 420 to move axially to the distal end, so that the bent section 422 extends out of the push member 430 and the occluder 20, and the bent section 422 restores its natural appearance. Then the second bent portion 4222 of the bent section 422 is further bent into the receiving portion 222, as shown in FIG. 16*c*. Further, the entire occluder 20 is moved close to a delivery sheath 490 to pull the occluder 20 in the stretched state into the delivery sheath 490, that is, the occluder 20 is loaded in the delivery sheath 490, as shown in FIG. 16*d*.

Figure 17A:
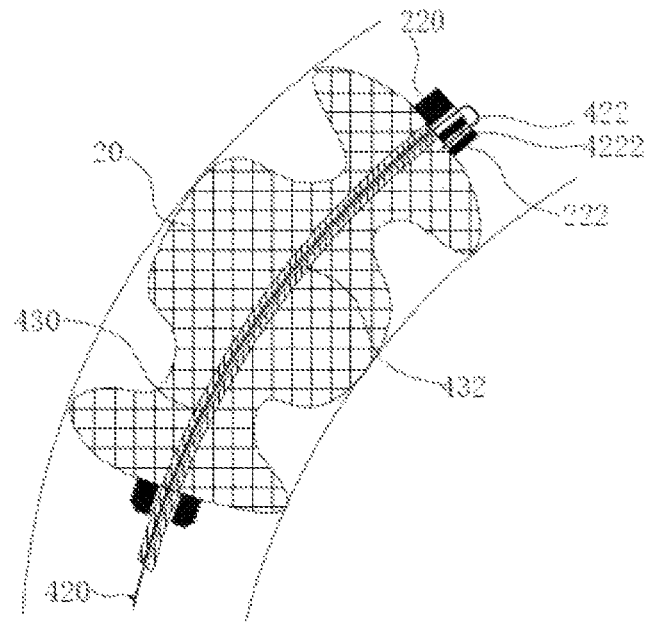
FIG. 17*a* and FIG. 17*b* are schematic change diagrams of positional relationships between an occluder and a regulating member according to one embodiment.

When the occluder 20 is delivered to a target position through the delivery sheath 490, the delivery device 40 is pushed as a whole to push the entire occluder 20 out of the delivery sheath 490. At this time, the distal end of the push member 430 still abuts against the first occlusion head 220, and the position of the sliding button 461 remains unchanged, so that the occluder 20 is still in the stretched state, and the regulating member 420 is still threaded through the inner cavity 432 of the push member 430; and the second bent portion 4222 of the bent section 422 is kept in the receiving portion 222, as shown in FIG. 17*a*.

Figure 17B:
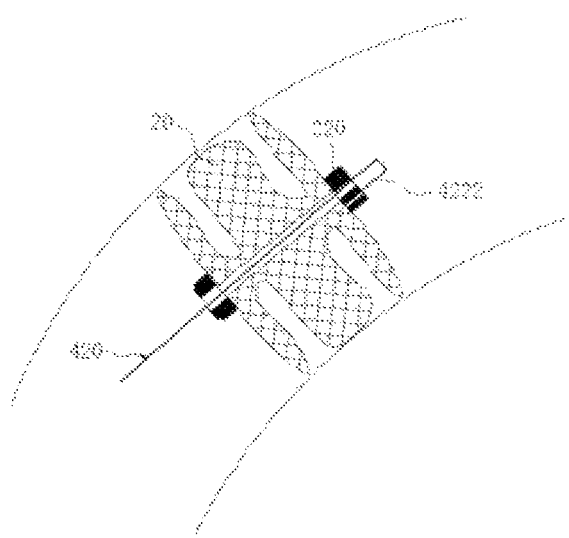

Further, the occluder 20 needs to be changed to an expanded state. When the sliding button 461 is not fixedly connected with the fixed portion 4521, the sliding button 461 moves axially towards the proximal end to drive the push member 430 and the regulating member 420 to move axially towards the proximal end at the same time, so that the bent section 422 of the regulating member 420 abuts against the first occlusion head 220, and the push member 430 and the regulating member 420 continue to move towards the proximal end under the abutment state, so as to compress the occluder 20. The axial distance between the proximal end and the distal end of the occluder 20 is adjusted to shape the occluder 20. In detail, after the occluder 20 is shaped (expanded state), the axial distance between the proximal end and the distal end of the occluder 20 is less than axial distance of the occluder 20 which is still in the stretched state. An outer wall of the occluder 20 abuts against the tissue wall to maintain the shape of the occluder 20, as shown in FIG. 17*b*.

The position of the sliding button 461 is kept unchanged. The second rotating member 453 is rotated to drive the guide rail 451 and the balance sliding rail 453 to rotate, thus driving the rotary portion 4522 to rotate relative to the fixed portion 4521 and synchronously move axially, which drives the regulating member 420 to move towards the distal end, so that the second bent portion 4222 leaves the receiving portion 222, as shown in FIG. 17*b*. The second rotating member 453 is continuously rotated to move the regulating member 420 towards the proximal end, so as to pull the second bent portion 4222 into the inner cavity 432 of the push member 430. The sliding button 461 is continuously moved towards the proximal end, so as to withdraw the push member 430 and the regulating member 420 from the occluder 20 together.

When the sliding button 461 is fixedly connected with the fixed portion 4521, similarly, the sliding button 461 moves axially towards the proximal end to drive the regulating member 420 and the push member 430 to move axially towards the proximal end at the same time. When the regulating member 420 moves axially towards the proximal end until the bent section 422 of the regulating member 420 abuts against the first occlusion head 220, the regulating member 420 and the push member 430 continue to move axially towards the proximal end, so as to further compress the occluder 20 and form the occluder 20. Further, the second rotating member 453 is rotated to make the regulating member 420 return to the inner cavity of the push member 430, and then the sliding button 461 is operated to withdraw the regulating member 420 and the push member 430 from the occluder 20 at the same time.

The methods of using the delivery system 100 when the sliding button 461 is fixedly connected with the fixed portion 4521 or not are described above. It should be noted that the method of using the delivery system 100 is not limited to the methods described above. According to the structure of the delivery device 40 and the cooperation relationship with the occluder 20, different operation sequences can be used, as long as the loading, delivery and releasing of the occluder 20 can be realized.

The first through hole 221, inner cavity 211 and second through hole 231 of the above-mentioned occluder 20 are communicated to form a path. In addition, the receiving portion 222 of the first occlusion head 220 is located on a side of the first through hole 221. During an implantation process, the regulating member 420 of the delivery device 40 can enter this path, and the bent section 422 of the regulating member 420 is at least partially received in the receiving portion 222 and can be hooked with the first occlusion head 220, thus avoiding separation of the regulating member 420 before the occluder 20 is formed. In addition, the bent section 422 of the regulating member 420 can be withdrawn from the receiving portion 222 and continue to move to the proximal end to abut against the occluder 20, so as to form the occluder 20. The regulating member 420 is continuously moved toward the proximal end to withdraw the regulating member 420 from the occluder 20. By means of the cooperation of the first through hole 221, the inner cavity 211, the second through hole 231 and the receiving portion 222, the regulating member 420 can be hooked with the occluder 20, and the regulating member 420 can be withdrawn from the occluder 20. Therefore, if a locking member is omitted, the axial length of the occluder 20 can be conveniently regulated by the regulating member 420 of the delivery device 40, so as to form the occluder 20. Therefore, the locking member in the occluder 20 may be omitted.

In addition, the locking member is omitted, so the occlusion frame 210 is not restrained by the locking member, and its axial length can be accurately regulated with the help of the delivery device 40. Therefore, the occluder is applicable to different implantation positions, and can be released at any lumen position.

The second bent portion 4222 is received in the receiving portion 222, and the first bent portion 4221 abuts against the first occlusion head 220. When the position of the regulating member 420 is fixed, the occluder 20 can be prevented from being released in advance, thus improving the reliability of operation.

In addition, in a delivery state, the second bent portion 4222 of the bent section 422 is received in the receiving portion 222 to prevent the regulating member 420 from scratching the inner wall of the delivery sheath 490.

The above delivery system 100 is provided with the regulating member 420 which cooperates with the occluder 20 in the delivery device 40. The regulating member 420 includes the bent section 422. The first driving assembly 450 drives the regulating member 420 to make the bent section 422 abut against the occluder 20. In the abutment state, the first driving assembly 450 continues to pull the regulating member 420 axially to the proximal end, so that the bent section 422 drives the distal end of the occluder 20 to move toward the proximal end. Thus, the occluder 20 restores the expanded state and is shaped.

It can be understood that the shaping means that the occluder 20 changes from the stretched state to the expanded state, so that the first occlusion unit 214, the middle occlusion unit 215 and the second occlusion unit 215 can restore the maximum radial dimension or be close to the maximum radial dimension.

The above delivery system 100 accomplishes the loading, pushing, releasing and forming of the occluder 20 by means of arranging the regulating member 420 and the push member 430 which cooperate with the occluder 20 in the delivery device 40. It is unnecessary to arrange an additional component in the occluder 20 to accomplish the loading, pushing, releasing and forming of the occluder 20, which makes the occluder 20 simple in structure. The preparation process is simple; the preparation efficiency is high; and the preparation cost is low.

Moreover, it is unnecessary to arrange an additional component in the occluder 20, which is conducive to reducing the radial dimension of the stretched occluder 20, so that the delivery sheath 490 with a smaller outer diameter can be used for delivery. At the same time, the stretched occluder 20 has good flexibility, which helps to pass through a curved vascular path.

For an occluder 20 of a smaller specification, the dimension of the first occlusion head 220 is smaller, and correspondingly, the aperture of the first through hole 221 is smaller. The outer diameters of the regulating member 420 and push member 430 matched with the occluder are also smaller. This makes it difficult to load the occluder 20.

Moreover, in an actual use process, before or after delivery, when the occluder 20 is loaded into the delivery sheath 490 according to the above method, the occluder 20 sometimes needs to be taken out of the delivery sheath 490 and re-mounted. For example, before delivery, the occluder 20 needs to be taken out of the delivery sheath 490 due to inspection requirements and then reloaded. After delivery, such as in surgery, the occluder 20 needs to be taken out due to poor release, and is reloaded into the delivery sheath 490 for implantation.

In the process of loading or reloading, it is not necessarily able to ensure that the push member 430 and the first through hole 221 in the first occlusion head 220 are strictly aligned (the axial central axes overlap), which makes loading difficult. When the axial central axis of the push member 430 deviates from the axial central axis of the first through hole 221 to a large extent, the regulating member 420 easily scratches the first occlusion head 220 in the process of moving to the distal end to extend out of the first occlusion head 220, which may damage the first occlusion head 220 made of a polymer material, or damage the regulating member 420 itself to a certain extent. Even though the push member 430 is strictly aligned with the first through hole 221, since the distal end of the regulating member 420 is the bent section 422, the bent section 422 is in the straightened state under restriction, and naturally has a trend to restore the bent state, which increases the difficulty of passing through a straight small hole (the first through hole 221), making loading or reloading more difficult.

Figure 18:
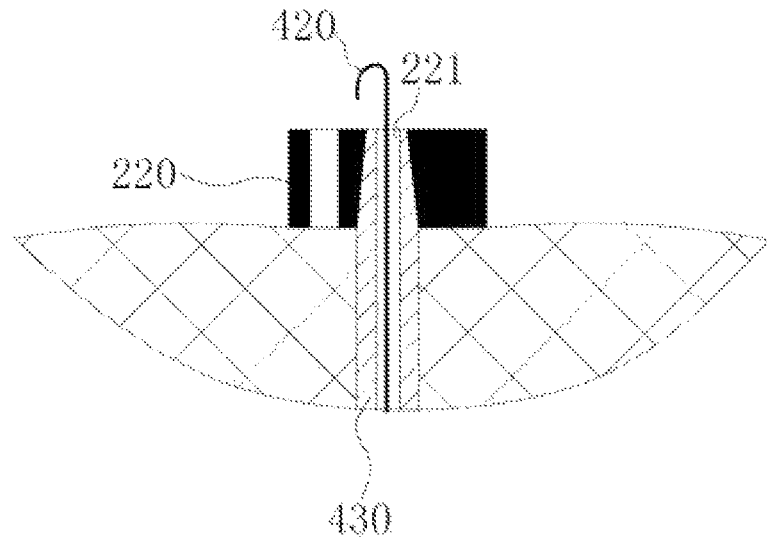
FIG. 18 is a schematic structural diagram of a first occlusion head of an occluder and a push member according to one embodiment.

In one embodiment, referring to FIG. 18, the first through hole 221 is a trapezoidal hole. A larger end of the trapezoidal hole is located at the proximal end, and a smaller end is located at the distal end. The distal end of the push member 430 is trapezoidal, so that the shape of the distal end of the push member 430 matches the shape of the first through hole 221. During loading, pushing and releasing, the distal end of the push member 430 extends into the first through hole 221, and the distal end of the push member 430 abuts against the hole wall of the first through hole 221. This arrangement helps to slow down or avoid the deviation between the push member 430 and the first through hole 221 in the loading process and the surgical process, so that the regulating member 420 can smoothly extend out of the first occlusion head 220 from the first through hole 221.

Figure 19:
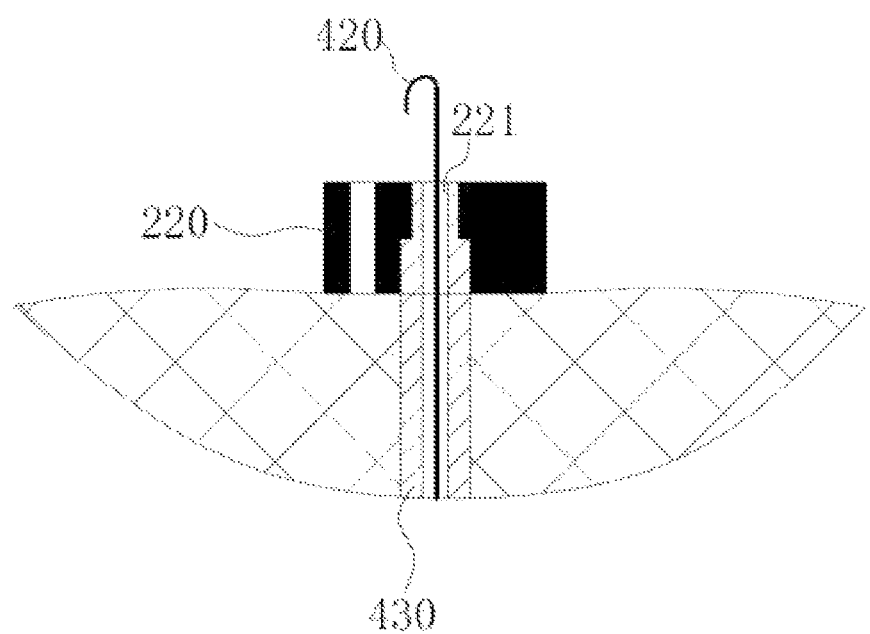
FIG. 19 is a schematic structural diagram of a first occlusion head of an occluder and a push member according to another embodiment.

In one embodiment, referring to FIG. 19, the first through hole 221 is a step hole. In detail, the first through hole 211 includes a larger end and a smaller end, the larger end of the step hole is located at the proximal end, and the smaller end is located at the distal end, the diameter of the large end is larger than the smaller end. A hole wall of the step hole includes steps. The distal end of the push member 430 is step-like, so that the shape of the distal end of the push member 430 matches the shape of the first through hole 221. The distal end of the push member 430 also includes steps. During loading, pushing and releasing, the distal end of the push member 430 extends into the first through hole 221, and the steps of the push member 430 abut against the steps of the first through hole 221. This arrangement maintains the push member 430 and the first through hole 221 directly facing each other in the loading process and the surgical process, so that the regulating member 420 can smoothly extend out of the first occlusion head 220 from the first through hole 221. In addition, even if the push member 430 is overexerted during the operational process, it will not extend out of the first through hole 221 and damage the first occlusion head 220 because the steps at the distal end of the push member 430 abut against the steps of the first through hole 221.

Figure 20:
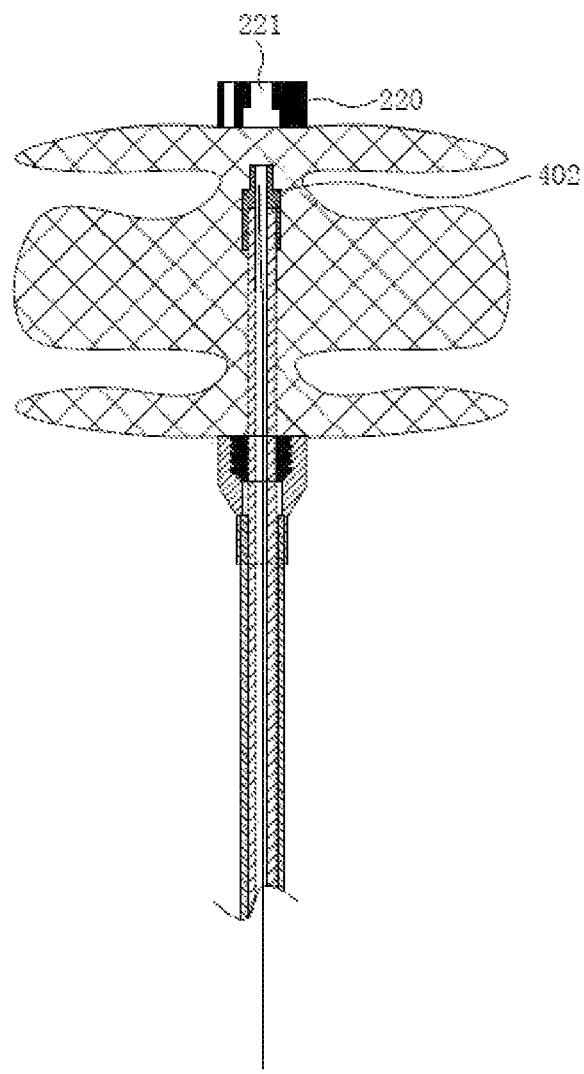
FIG. 20 is a schematic structural diagram of a first occlusion head of an occluder and a push member according to another embodiment.
Figure 21:
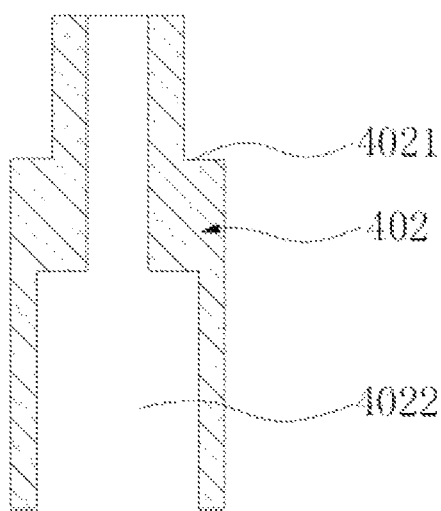
FIG. 21 is a schematic structural diagram of a transition member according to one embodiment.

In one embodiment, referring to FIG. 20, the first through hole 221 is a step hole. A larger end of the step hole is located at the proximal end, and a smaller end is located at the distal end. A hole wall of the step hole includes steps. The push member 430 is a hollow cylindrical pipe fitting. The delivery device 40 also includes a transition member 402. Referring to FIG. 21, the transition member 402 is of a hollow structure with a "convex" cross section. Steps 4021 are formed at a distal end of an outer wall of the transition member 402, and the steps 4021 surround a peripheral surface of the distal end of the transition member 402. An open pore 4022 axially extending from the distal end of the transition member 402 to the proximal end is formed in the middle of the transition member 402. The cross section of the open pore 4022 is roughly "convex", and a small end of the open pore 4012 is located at the distal end and a large end is located at the proximal end. In detail, the open pore 4022 includes a large diameter section and a small diameter section, the large diameter section connects with the small diameter section, and the large diameter section is located on the proximal side of the small diameter section. The shape and dimension of the large end of the open pore 4022 match the shape and dimension of the distal end of the push member 430, so that the transition member 402 can surround the distal end of the push member 430 and be fixedly connected with the push member 430. During loading, pushing and releasing, the distal end of the transition member 402 extends into the first through hole 221, and the steps 4021 of the transition member 402 abut against the steps of the first through hole 221. In this way, operations are facilitated, and the first occlusion head 220 and/or the regulating member 420 are prevented from being damaged. At the same time, because the outer diameter of the push member 430 is extremely small, which is usually less than 1 mm, forming steps on the outer wall of the push member 430 is very difficult, and requires a high level of craftsmanship, making it challenging to ensure precision The transition member 402 is additionally arranged to avoid machining of the distal end of the push member 430 to form steps. Therefore, the additional arrangement of the transition member 402 can reduce the machining difficulty, which is conducive to improving the preparation efficiency, ensuring the precision, and improving the production yield.

It can be understood that when the first through hole 221 is a trapezoidal hole, the aperture D1 of the first through hole 221 refers to a minimum width in a radial direction of the first through hole 221. When the first through hole 221 is a step hole, the aperture D1 of the first through hole 221 refers to an aperture of a smaller portion of the first through hole 221, that is, the radial width of a portion of the first through hole 221 that is far away from the second occlusion head 230 is D1.

Referring to FIG. 5 again, the delivery device 40 also includes a limiting assembly 470. The limiting assembly 470 is configured to limit the push member 430 to avoid misoperations and poor release of the occluder 20.

Figure 22:
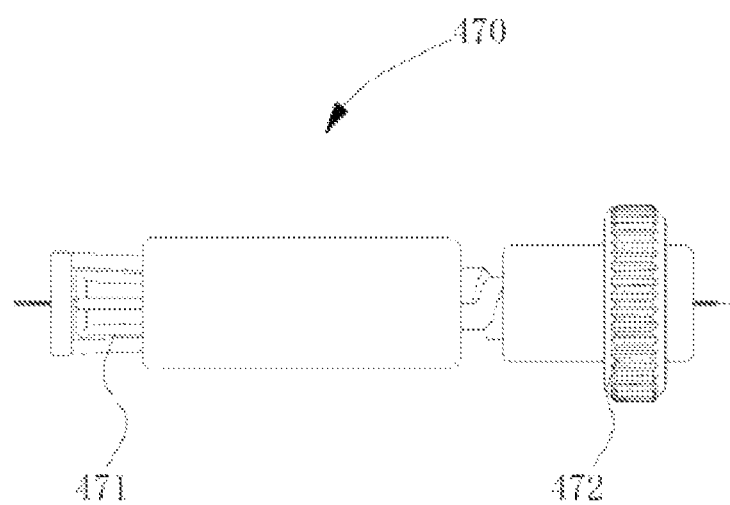
FIG. 22 is a schematic structural diagram of a limiting assembly according to one embodiment.
Figure 23:
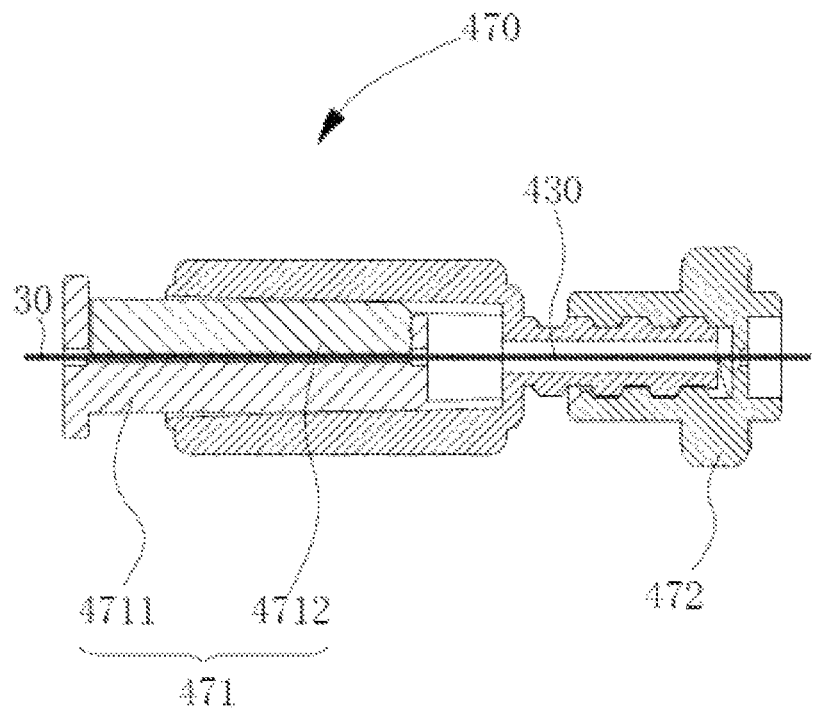
FIG. 23 is a schematic sectional view of FIG. 22.

Referring to FIG. 22 and FIG. 23 together, the limiting assembly 470 includes a clamping member 471 and a locking member 472 connected with the clamping member 471. The locking member 472 is configured to regulate a clamping force of the clamping member 471 to achieve limitation or no limitation of the push member 430. The clamping member 471 is arranged in the shell 411. In one embodiment, the clamping member 471 includes a first clamping portion 4711 and a second clamping portion 4712. A receiving region is formed between the first clamping portion 4711 and the second clamping portion 4712, and the push member 430 extends into the receiving region. The locking member 472 simultaneously surrounds the first clamping portion 4711 and the second clamping portion 4712. By means of rotating the locking member 472, a proximity between the first clamping portion 4711 and the second clamping portion 4712 can be regulated to control the dimension of the receiving region. When the radial dimension of the receiving region is greater than that of the push member 430, the push member 430 may move with the movement of the sliding button 452. When the dimension of the receiving region is less than the radial dimension of the push member 430, the push member 430 cannot move, that is, it is limited.

The shell 411 of the operating handle 410 is provided with a first operating window, and the upper cover 412 is provided with a second operating window. The first operating window is opposite to the second operating window. The locking member 472 is arranged in the shell 411, and the locking member 472 extends out of the first operating window and the second operating window to facilitate the operations.

The delivery device 40 of the above delivery system 100 can deliver the occluder 20 to a diseased position, and control the movement of the regulating member 420 after pushing the occluder 20 out of the delivery sheath 490, so as to recover the occluder 20 to the expanded state and shape the occluder 20. The operations are convenient and reliable. In addition, the structure of the occluder 20 is simple, and no additional forming auxiliary structure is required.

In one embodiment, the occluder 20 is a heart occluder, such as an atrial septal defect occluder, a ventricular septal defect occluder, and a left atrial appendage occluder.

In one embodiment, the occluder 20 is a vascular occluder, which can be used for blocking blood flow to treat vascular malformations or block blood flow to treat tumors, etc.

Figure 24:
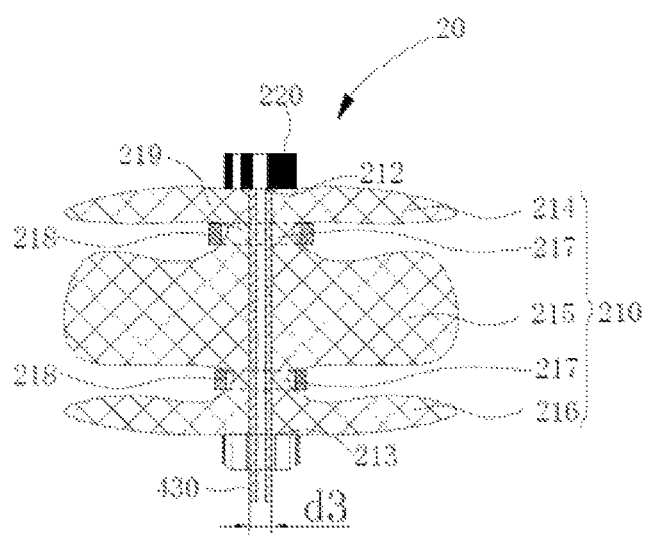
FIG. 24 is a schematic structural diagram of an occluder according to another embodiment.

Referring to FIG. 24, in one embodiment, the occluder 20 also includes a fixing member 218. The fixing member 218 surrounds the waist portions 217 of the occlusion frame 210. A channel 219 extending axially from a distal end of the fixing member 218 to a proximal end of the fixing member 218 is formed in the middle of the fixing member 218. The channel 219 should be large enough to ensure that the inner cavity 211 of the occlusion frame 210 can still be kept unblocked axially after the fixing member 218 surrounds the waist portions 217; that is, the inner cavity 211 (not shown in FIG. 24) of the occlusion frame 210, the first opening 212 and the second opening 213 are communicated to form a path.

The number of the fixing member 218 corresponds to the number of the waist portion 217. In the embodiment shown in FIG. 24, there are two waist portions 217, and correspondingly, there are two fixing members 218.

In another embodiment, there are a plurality of middle occlusion units 215, and there are more than two waist portions 217. The plurality of middle occlusion units 215 and the plurality of waist portions 217 are alternately arranged along an axial direction. The middle occlusion unit 215 located at the most distal end is connected with the first occlusion unit 214 through the waist portion 217, and the middle occlusion unit 215 located at the most proximal end is connected with the second occlusion unit 216 through the waist portion 217. A plurality of fixing members 218 respectively surround the plurality of waist portions 217. The channel 219 should be large enough, so that there is still a space in the middle of the channel 219 after the fixing members 218 surround the waist portions 217, and the inner cavity 211 of the occlusion frame 210 can still axially extend from the first occlusion unit 214 to the second occlusion unit 216.

The axial lengths of the plurality of middle occlusion units 215 may be equal or unequal. Among the plurality of middle occlusion units 215, the axial lengths of all the middle occlusion units 215 are greater than the axial lengths of the first occlusion unit 214 and the second occlusion unit 216, or the axial lengths of some middle occlusion units 215 are greater than the axial lengths of the first occlusion unit 214 and the second occlusion unit 216, and the axial lengths of some middle occlusion units 215 are equal to the axial lengths of the first occlusion unit 214 and the second occlusion unit 216.

The first opening 212, the second opening 213, the channel 219, the first through hole 221 and the second through hole 231 are coaxial, so that in the loading process, the push member 430 moves axially from the second through hole 231 through the second opening 213 into the inner cavity 211 until the distal end of the push member 430 abuts against the first occlusion head 220, so as to assist in loading and subsequent forming. Since the fixing members 218 surround the waist portions 217, the fixing members 218 further fix the above path; that is, further fix the moving path of the push member 430 in the occlusion frame 210, which is conducive to preventing the push member 430 from deviating from a preset direction and scratching the occlusion frame 210, leading to damage to the occlusion frame 210, and which is also conducive to good alignment between the push member 430 and the first through hole 221, so as to facilitate the regulating member 420 to extend smoothly from the inner cavity 432 of the push member 430 into the first through hole 221 of the first occlusion head 220.

Therefore, the above occluder 20 can omit the locking member. The occluder 20 can be conveniently loaded after the locking member is omitted. The occluder 20 with no locking member has good flexibility, which is conducive to passing through a curved vascular path or adapting to a curved vascular diseased position.

In one embodiment, the fixing member 218 is a sleeve made of a polymer material, and a channel extending axially from the distal end of the sleeve to the proximal end is formed in the middle of the sleeve. The sleeve surrounds the waist portion 217, and an inner wall of the sleeve contacts a peripheral surface of the waist portion 217. The channel should be large enough, so that there is still sufficient space in the channel after the sleeve surrounds the waist portion 217, so as to allow the push member 430 to pass. However, the channel should not be too large, otherwise the limiting effect on the push member 430 is poor. The polymer material forming the sleeve is a polymer material that can be absorbed by the organism, so that the entire occluder 20 can be absorbed by the organism.

The axial length of the sleeve is less than or equal to the axial length of the waist portion 217. In one embodiment, the ratio of the axial length of the sleeve to the axial length of the waist portion 217 is 1: (2-5), so as to prevent the influence of an extremely large axial length of the sleeve on the overall flexibility of the occluder 20, and also prevent machining difficulties caused by an extremely small axial length of the sleeve.

Figure 25:
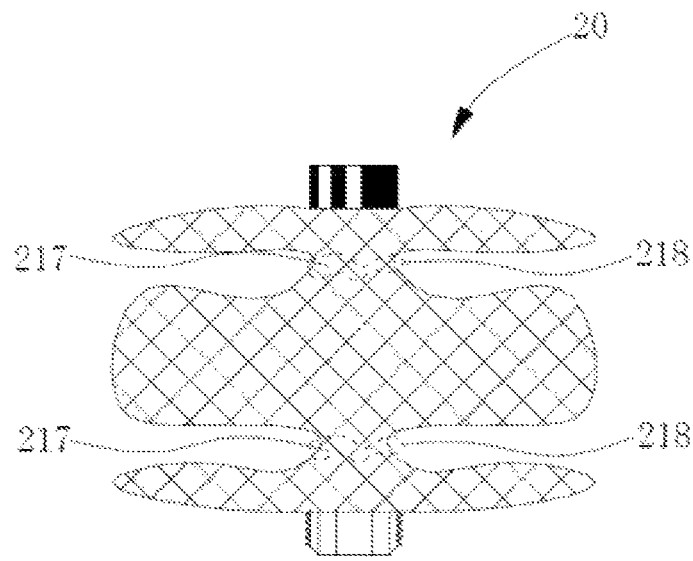
FIG. 25 is a schematic structural diagram of an occluder according to another embodiment.

In one embodiment, referring to FIG. 25, the fixing member 218 is a ring structure formed by winding a polymer wire around a periphery of the waist portion 217. The polymer wire is a flexible wire such as a polymer fiber wire and a polymer medical suture. In one embodiment, the polymer wire is an absorbable polymer wire, so that the entire occluder 20 can be absorbed by the organism. The polymer fiber wire, the polymer medical suture and other polymer wires are relatively soft. The ring structure formed by winding the polymer wire at the periphery of the waist portion 217 is also soft, so that the fixing member 218 will not significantly increase the overall rigidity of the occluder 20. The occluder 20 can be still kept sufficiently flexible even if there are two or more fixing members 218. In addition, the preparation or machining is simpler and easier to operate by means of forming the fixing member 218 surrounding the waist portion 217 by the polymer wire.

Figure 26:
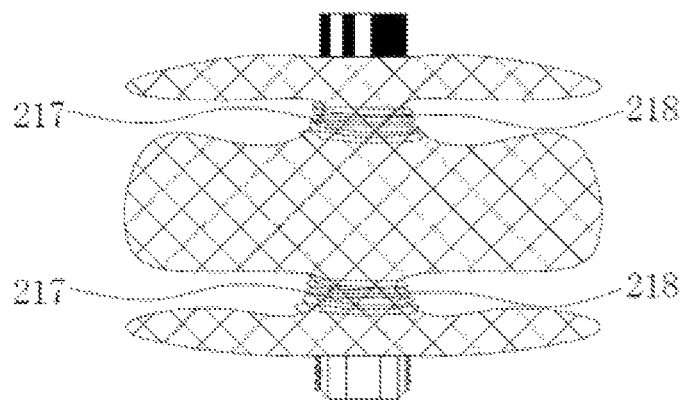
FIG. 26 is a schematic structural diagram of an occluder according to another embodiment.

The polymer wire is wound on the waist portion 217 for one turn (see FIG. 25) or more turns (see FIG. 26) to form the fixing member 218. It can be understood that the winding tightness of the polymer wire should be appropriate. On the one hand, the polymer wire is reliably fixed with the waist portion 217. On the other hand, after the polymer wire is wound on the waist portion 217, the channel formed by the polymer wire should be large enough to allow the push member 430 to pass.

When the polymer wire is wound on the waist portion 217 for one turn, a diameter of the polymer wire is relatively large. When the polymer wire is wound on the waist portion 217 for multiple turns, the polymer wire with a smaller diameter can be used. The polymer wire is wound on the waist portion 217 for multiple turns to form the fixing member 218, which facilitates a reliable connection between the fixing member 218 and the waist portion 217.

In one embodiment, whether the fixing member 218 is a sleeve formed by the polymer material or a ring structure formed by winding the polymer wire on the periphery of the waist portion 217, the width of the channel of the fixing member 218 is D6. In the natural state, the radial width of the waist portion is D7. The outer diameter D3 of the push member 430 is less than D6, so that the push member 430 can pass through the fixing member 218 smoothly. D7 is greater than D6, which facilitates the reliable connection between the fixing member 218 and the waist portion 217.

In one embodiment, D3 is 0.1-4 mm less than D6, and D7 is 2-60 mm greater than D6, so that the push member 430 can smoothly pass through the fixing member 218, and the fixing member 218 is reliably connected with the waist portion 217, so as to prevent the fixing member 218 from falling off from the waist portion 217 when the occluder 20 is axially stretched and loaded in the delivery sheath 490. This is particularly important for the embodiment where the fixing member 218 is the ring structure formed by winding the polymer wire on the periphery of the waist portion 217.

In the occluder 20, the fixing member 218 surrounds the waist portion 217, so that the fixing member 218 is conducive to fixing the moving path of the push member 430 in the occlusion frame 210, and the push member 430 moves along the fixed path to the distal end of the push member 430 and abuts against the first occlusion head 220 of the occluder 20, thus achieving the axial stretching of the occluder 20 and facilitating the loading. In addition, during the loading process, due to the limitation of the fixing member 218, it is possible to prevent the distal end of the push member 430 from being disconnected from the first occlusion head 220 because of slipping or improper operations, so that the push member 430 can be kept in abutment against the first occlusion head 220 without offset, thus ensuring that the occluder 20 can be smoothly loaded.

Moreover, after the occluder 20 is delivered to the diseased position through the delivery sheath 490, when the occluder 20 is pushed out of the delivery sheath 490, and before it is confirmed whether the occluder 20 is located at the correct position, due to the limitation of the fixing member 218, the push member 430 can be kept in abutment against the first occlusion head 220 without offset, so that the occluder 20 is reliably kept in the axially stretched state to allow an operator to adjust the position of the occluder 20.

At the same time, the fixing member 218 is conducive to fixing the relative position between the push member 430 and the first occlusion head 220, and is conducive to avoiding unnecessary scratching between the push member 430 and the first occlusion head 220 and/or the occlusion frame 210, so as to avoid damage to the first occlusion head 220 and/or the occlusion frame 210.

Therefore, the occluder 20 can omit the locking member. The occluder 20 of the delivery system 100 cooperates with the delivery device 40, making it more convenient and reliable to load and form the occluder 20.

In one embodiment, when there is a middle occlusion unit 215, there are two waist portions 217, and the fixing members 218 are the ring structures formed by winding the polymer wires on the peripheries of the waist portions 217, the winding tightness of the polymer wires serving as the two fixing members 218 is not equal, and the widths D6 of the channels of the two fixing members 218 are not equal. The value of D6 of the fixing member 218 located at the distal end is larger. In this way, convenient loading and forming are guaranteed, so that it is more convenient to adjust the axial length of the occluder 20, and the surgery can be successful.

The technical features of the embodiments described above can be arbitrarily combined. In order to make the description concise, all possible combinations of various technical features in the above embodiments are not completely described. However, the combinations of these technical features should be considered as the scope described in this specification as long as there is no contradiction in them.

The above-mentioned embodiments only express several implementation modes of the present invention, and their descriptions are more specific and detailed, but they cannot be understood as limiting the patent scope of the present invention. It should be noted that those of ordinary skill in the art can further make various transformations and improvements without departing from the concept of the present invention, and these transformations and improvements all fall within the protection scope of the present invention. Therefore, the protection scope of the patent of the present invention shall be subject to the appended claims.

The invention claimed is:

1. A delivery device, configured to deliver an implantable instrument, wherein the delivery device comprises:
   an operating handle, comprising an accommodating cavity;
   a regulating member, wherein in a natural state, the regulating member comprises a bent section, and an end of the regulating member that is away from the bent section extends into the accommodating cavity; and
   a first driving assembly, arranged on the operating handle, connected to the regulating member, and configured to control an axial displacement of the regulating member, so that the bent section of the regulating member abuts against an implantable instrument to achieve shaping of the implantable instrument;
   wherein the first driving assembly comprises a guide rail, the delivery device further comprises a push member and a second driving assembly; the second driving assembly comprises a sliding button; the push member is connected with the sliding button; and the sliding button is movable axially along the guide rail to drive the push member to move axially.

2. The delivery device according to claim 1, wherein the first driving assembly comprises a first rotating member and a second rotating member; the guide rail and the first rotating member are accommodated in the accommodating cavity; the guide rail is connected with the first rotating member and the second rotating member; the regulating member is connected with the first rotating member; the second rotating member is connected with the operating handle and is able to rotate relative to the operating handle; the rotation of the second rotating member drives the guide rail to rotate; the rotation of the guide rail drives the first rotating member to rotate; and the rotation of the first rotating member drives the regulating member to axially move.

3. The delivery device according to claim 2, wherein the first rotating member comprises a fixed portion, a rotary portion and two abutment portions; the fixed portion is fixed in the accommodating cavity; the rotary portion is connected with the guide rail, and the rotary portion is rotatable relative to the fixed portion; the regulating member is threaded through the rotary portion; the regulating member is not fixedly connected with the rotary portion; the two abutment portions are fixedly connected with the regulating member; and the two abutment portions are located at two ends of the rotary portion.

4. The delivery device according to claim 3, wherein an internal thread is formed on an inner wall of the fixed portion; an external thread is formed on an outer wall of the rotary portion; and the internal thread and the external thread cooperate with each other to enable the rotary portion to be rotatable and axially movable relative to the fixed portion.

5. The delivery device according to claim 3, wherein the first rotating member further comprises a reinforcement tube; the reinforcement tube surrounds the regulating member; the reinforcement tube is threaded through the rotary portion; and the two abutment portions are fixedly connected with the reinforcement tube.

6. The delivery device according to claim 1, wherein the fixed portion is fixedly connected with the sliding button or the fixed portion is not fixedly connected with the sliding button.

7. A delivery device, configured to deliver an implantable instrument, wherein the delivery device comprises:
   an operating handle, comprising an accommodating cavity;
   a regulating member, wherein in a natural state, the regulating member comprises a bent section, and an end of the regulating member that is away from the bent section extends into the accommodating cavity; and
   a first driving assembly, arranged on the operating handle, connected to the regulating member, and configured to control an axial displacement of the regulating member, so that the bent section of the regulating member abuts against an implantable instrument to achieve shaping of the implantable instrument, wherein the first driving assembly comprises a guide rail, a first rotating member and a second rotating member; the guide rail and the first rotating member are accommodated in the accommodating cavity; the guide rail is connected with the first rotating member and the second rotating member;

wherein the second rotating member comprises a base, a regulating rod and a screw cap; the regulating rod is inserted into the base; the screw cap surrounds the regulating rod and the base; the base is rotatably connected with the operating handle; and the guide rail is connected with the regulating rod.

8. The delivery device according to claim 1, wherein the regulating member comprises a straight extending section; the straight extending section is connected with the bent section;
the bent section comprises a first bent portion and a second bent portion connected with the first bent portion; an end of the first bent portion that is far away from the second bent portion is connected with the straight extending section; in the natural state, the first bent portion is not parallel to the straight extending section; or,
the bent section is a straight rod type; and the bent section is bent relative to the straight extending section.

9. The delivery device according to claim 8, wherein the diameter of the straight extending section is greater than the diameter of the bent section; or, the diameter of an end of the straight extending section that is far away from the bent section is greater than the diameter of the bent section.

10. The delivery system according to claim 9, wherein the implantable instrument comprises a first occlusion head and a second occlusion head, the first occlusion head providing a first through hole and a receiving portion located on a side of the first opening, the second occlusion head providing a second through hole, the regulating member passing through the second through hole, the first through hole and the receiving portion, the bent section is accommodated in the receiving portion.

11. The delivery system according to claim 10, wherein the occlusion frame providing a first opening located on the distal end and a second opening located on the proximal end, the first occlusion head arranged on the distal end of the occlusion frame and the first through hole communicates with the first opening, the second occlusion head arranged on the proximal end of the occlusion frame and the second through hole communicates with the second opening, wherein the first through hole is a trapezoidal hole or a step hole.

12. The delivery system according to claim 11, wherein the trapezoidal hole or the step hole comprises a larger end and a smaller end, the larger end is located at the proximal end, and the smaller end is located at the distal end.

13. A delivery system, comprising:
an implantable instrument comprising an occlusion frame that has a waist portion, the implantable instrument having a fixing member that surrounds the waist portions of the occlusion frame, and a channel extending axially from a distal end of the fixing member to a proximal end of the fixing member is formed; and
a delivery device comprising:
an operating handle, comprising an accommodating cavity;
a regulating member, wherein in a natural state, the regulating member comprises a bent section, and an end of the regulating member that is away from the bent section extends into the accommodating cavity; and
a first driving assembly, arranged on the operating handle, connected to the regulating member, and configured to control an axial displacement of the regulating member, so that the bent section of the regulating member abuts against an implantable instrument to achieve shaping of the implantable instrument;
wherein the bent section of the regulating member of the delivery device is able to abut against the implantable instrument.

* * * * *